United States Patent [19]
Fujikawa et al.

[11] Patent Number: 5,883,737
[45] Date of Patent: Mar. 16, 1999

[54] DIODE LASER EXCITATION SOLID-STATE LASER AMPLIFIER AND DIODE LASER EXCITATION SOLID-STATE LASER

[75] Inventors: Shuichi Fujikawa; Tetsuo Kojima, both of Tokyo, Japan

[73] Assignee: Mitsubishi Denki Kabushiki Kaisha, Tokyo, Japan

[21] Appl. No.: 823,582

[22] Filed: Mar. 25, 1997

[30] Foreign Application Priority Data

Mar. 27, 1996 [JP] Japan .................................... 8-72659

[51] Int. Cl.$^6$ ................................ H01S 3/00; H01S 3/93
[52] U.S. Cl. .................. 359/345; 359/134; 359/160; 372/75
[58] Field of Search .................................. 359/134, 160, 359/345; 345/39, 40; 372/70, 72, 75

[56] References Cited

U.S. PATENT DOCUMENTS

| | | | |
|---|---|---|---|
| 4,016,500 | 4/1977 | Pilloff ........................................ | 372/35 |
| 5,033,058 | 7/1991 | Cabaret et al. ............................ | 372/75 |
| 5,086,433 | 2/1992 | Pocholle et al. .......................... | 372/72 |
| 5,278,860 | 1/1994 | August et al. ............................. | 372/70 |
| 5,287,371 | 2/1994 | Bournes .................................... | 372/72 |
| 5,307,365 | 4/1994 | Stappaerts et al. ....................... | 372/72 |
| 5,317,590 | 5/1994 | August et al. ............................. | 372/109 |
| 5,661,738 | 8/1997 | Yasui et al. ............................... | 372/35 |

OTHER PUBLICATIONS

John Andrews and Wendy K. Rochelle; "Recent Advances In High–Power Diode–Pumped Solid–State Lasers"; IEEE Lasers and Electro–Optics Society Annual Meeting Conference Proceedings; Nov. 4–9, 1990; pp. 111–115.

D. Golla et al.: "300–W cw Diode–Laser Side–Pumped ND:YAG Rod Laser"; 1995 Optical Society of America; pp. 1148–1150.

*Primary Examiner*—Nelson Moskowitz
*Attorney, Agent, or Firm*—Sughrue, Mion, Zinn, Macpeak & Seas, PLLC

[57] ABSTRACT

A diode laser excitation sold-state laser amplifier capable of withstanding a mechanical disturbance, is easily fabricated and adjusted, can stably generate a high-efficiency high-quality laser beam and easily realize a large output. A diode laser excitation solid-state laser using this amplifier, including: a solid-state laser rod extending along the optical axis of a laser beam and including an active medium therein; two side plates for supporting both ends of the solid-state laser rod respectively; a flow tube provided to enclose the solid-state laser rod and containing a cooling medium; a plurality of excitation modules each having a flat substrate, with a hole formed at the center thereof through which the solid-state laser rod is passed, and at least one excitation light source, for providing excitation light from the lateral of the solid-state laser rod; and connecting and fixing means and for connecting a plurality of the excitation modules to each other and fixing them to the side plates.

8 Claims, 23 Drawing Sheets

DIODE LASER EXCITATION SOLID-STATE LASER AMPLIFIER AND DIODE LASER EXCITATION SOLID-STATE LASER

BACKGROUND OF THE INVENTION

1. Field of the Invention

The present invention relates to a diode laser excitation solid-state laser amplifier and a diode laser excitation solid-state laser, particularly to the excitation section of the laser.

2. Description of the Related Art

FIG. 28 is a block diagram of an excitation module used for a conventional diode laser excitation solid-state laser amplifier shown in, for example, the document "Solid-State Laser Engineering, Springer-Verlag, p. 348". In FIG. 28, two diode laser arrays 3 are fixed to one side of a trigonal-prismatic heat sink 5 by turning its light emitting section 4 to the left of FIG. 28. Moreover, a cylindrical lens 34 for condensing the excitation light emitted from the diode laser arrays 3 is fixed to the heat sink 5 adjacently to the light emitting section 4 of the diode laser arrays 3. An electric cooler 301 for adjusting the temperature of the heat sink 5 is set to the side opposite to the light emitting section 4 of the diode laser arrays 3 of the heat sink 5. Moreover, at the outside of the cooler 301, a heat exchanger 302 for removing heat from the diode laser arrays 3 through the heat sink 5 and the electric cooler 301, is set adjacently to the electric cooler 301.

Cooling water circulates through the heat exchanger 302 to exchange heat with the diode laser arrays 3 through the heat sink 5. The electric cooler 301 is set between the heat exchanger 302 and the heat sink 5 so as to be sandwiched by them. Therefore, by cooling the heat sink 5 by the electric cooler 301, it is possible to quickly adjust the temperature of the diode laser arrays 3 without changing the temperature of the cooling water to be circulated through the heat exchanger 302.

Two diode laser arrays 3 are fixed to the heat sink 5 in the same direction. The cylindrical lens 34 is fixed to the front of the light emitting section 4 of the diode laser arrays 3 and the excitation light emitted from the light emitting section 4 is condensed by the cylindrical lens 34. Moreover, the electric cooler 301 is set between the heat sink 5 and the heat exchanger 302 so as to be sandwiched by them. Therefore, it is possible to adjust the wavelength of the excitation light emitted from the diode laser arrays 3 by adjusting the temperature of the heat sink 5 with the electric cooler 301. An excitation module 90 comprises such components as the heat sink 5, diode laser arrays 3, cylindrical lens 34, electric cooler 301, and heat exchanger 302.

FIG. 29 is a perspective view showing a state in which the excitation module 90 having the structure in FIG. 28 is fixed to a support plate 303 together with the solid-state laser rod 1 and a flow tube 2. In the case of the above structure, four excitation modules 90 are set to one solid-state laser rod 1 around the rod 1. Moreover, each excitation module 90 is set by the fact that an end face of the heat sink 5 is fixed to the support plate 303 and one end of the module 90 is supported. Furthermore, each light emitting section 4 of the diode laser array pair 3 fixed to each of four excitation modules 90 is turned toward the solid-state laser rod 1 and the excitation light emitted from the light emitting section 4 receives an action so that a condensed line is produced in the cross section of the solid-state laser rod 1 by the cylindrical lens 34. Therefore, the flow tube 2 is provided around the solid-state laser rod 1 and a cooling medium is flown to a space formed between the solid-state laser rod 1 and the flow tube 2 to cool the solid-state laser rod 1.

Because a conventional diode laser excitation solid-state laser amplifier and a diode laser excitation solid-state laser using the amplifier are constituted as described above, a problem occurs that only one excitation light applying direction is obtained from one excitation module. Therefore, a problem occurs that, to obtain uniform excitation distribution in the solid-state laser rod 1, a plurality of excitation modules corresponding to the number of applying directions must be prepared to emit excitation light from a plurality of directions.

Moreover, to increase the output of a diode laser excitation solid-state laser, the number of diode laser arrays 3 set to excitation modules is increased. Therefore, the length of the heat sink 5 must be increased along the solid-state laser rod 1. Furthermore, to obtain a uniform excitation distribution in the longitudinal direction of the solid-state laser rod 1, it is necessary to keep the interval between every diode laser array 3 and the solid-state laser rod 1 constant. Therefore, a problem occurs that a higher manufacturing accuracy is required and fabrication of the excitation module 90 as a laser is further increased in size.

Furthermore, because an excitation module is supported at only one end, problems occur that the distances between the diode laser array 3 and the solid-state laser rod 1 are easily changed and it is difficult to keep stable amplification characteristic and laser output. Furthermore, because the uniformity of the excitation distribution in the solid-state laser rod 1 is also deteriorated, a problem occurs that the quality of laser beam is also deteriorated.

SUMMARY OF THE INVENTION

The present invention is made to solve the above problems and its object is to provide a diode laser excitation solid-state laser amplifier, which can withstand mechanical disturbance, is easily fabricated and adjusted, can stably and efficiently generate a high-quality laser beam and easily increase its output, and a diode laser excitation solid-state laser using this amplifier.

In order to achieve the above object, according to one aspect of the present invention, there is provided a diode laser excitation solid-state laser amplifier which comprises a solid-state laser rod extending along the optical axis of a laser beam and including an active medium therein, side plates for supporting both ends of the solid-state laser rod respectively, a flow tube which is provided so as to enclose the solid-state laser rod and through which a cooling medium for cooling the solid-state laser rod is circulated, a plurality of excitation modules arranged along the solid-state laser rod, each excitation module comprising a flat substrate having a hole formed at the center thereof through which the solid-state laser rod is passed, at least one excitation light source fixed to the flat substrate for providing excitation light to the solid-state laser rod from the side of the solid-state laser rod, and connecting and fixing means for connecting a plurality of the excitation modules and fixing them to the side plates.

According to another aspect of the present invention, there is provided a diode laser excitation solid-state laser amplifier, wherein the excitation modules are connected to each other at a predetermined angle while successively shifting the angle about the solid-state laser rod.

According to still another aspect of the present invention, there is provided a diode laser excitation solid-state laser amplifier, wherein an excitation light source setting portion also serves as means for cooling an excitation light source.

According to a further aspect of the present invention, there is provided a diode laser excitation solid-state laser amplifier which has a condensing or transmitting means set between the excitation light source and the solid-state laser rod to the solid-state laser rod for condensing or transmitting excitation light.

According to a still further aspect of the present invention, there is provided a diode laser excitation solid-state laser amplifier which has a reflector having an opening for passing the excitation light and a reflection surface provided so as to enclose the solid-state laser rod.

According to another aspect of the present invention, there is provided a diode laser excitation solid-state laser amplifier, wherein the reflection surface is a diffusive reflect surface.

According to still another aspect of the present invention, there is provided a diode laser excitation solid-state laser amplifier, wherein the reflector also serves as means for fixing the excitation light source.

According to a further aspect of the present invention, there is provided a diode laser excitation solid-state laser which comprises a solid-state laser rod extending along the optical axis of a laser beam and including an active medium therein, side plates for supporting both ends of the solid-state laser rod respectively, a flow tube which is provided so as to enclose the solid-state laser rod and through which a cooling medium for cooling the solid-state laser rod is circulated, a plurality of excitation modules arranged along the solid-state laser rod, each excitation module having a flat substrate with a hole formed at the center thereof through which the solid-state laser rod is passed and at least one excitation light source fixed to the flat substrate for providing excitation light to the solid-state laser rod from the side of the solid-state laser rod, and connecting and fixing means for connecting and fixing a plurality of the excitation modules to each other and fixing them to the side plates, a partial reflection mirror provided for one end of the solid-state laser rod, and a total reflection mirror provided for the other end of the solid-state laser rod.

DESCRIPTION OF THE PREFERRED EMBODIMENTS

Figure 1:
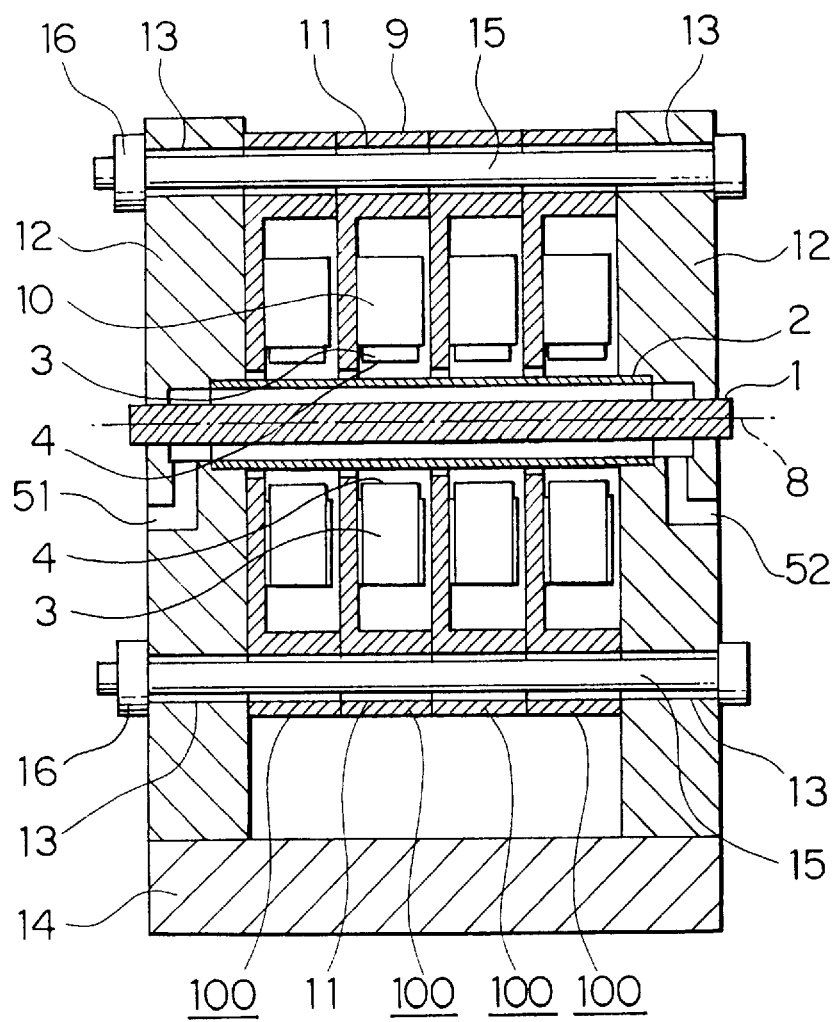
FIG. 1 is a transverse sectional view showing a diode laser excitation solid-state laser amplifier of the present invention.

Embodiment 1:

FIG. 1 is a transverse sectional view showing a diode laser excitation solid-state laser amplifier of the present invention.

Figure 2:
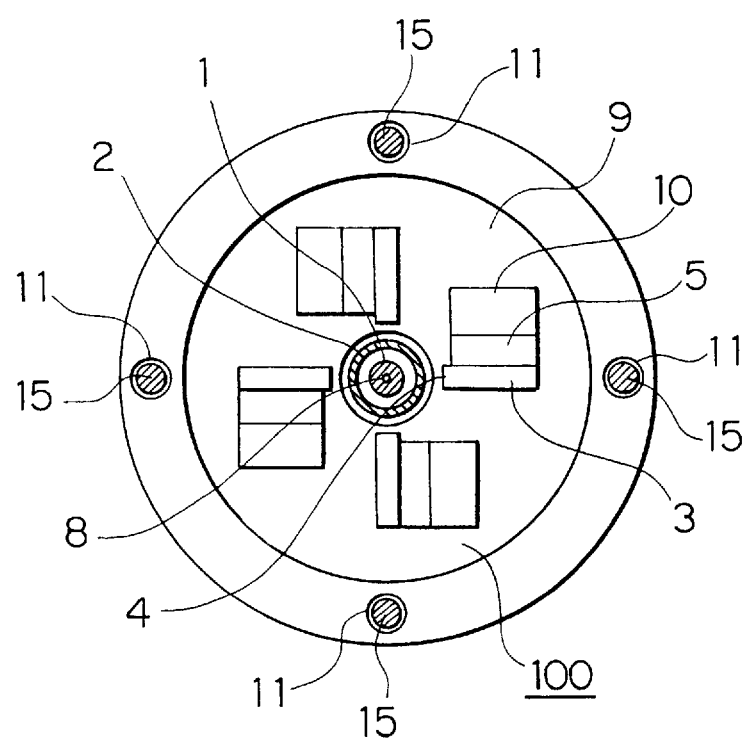
FIG. 2 is a local longitudinal sectional view showing a diode laser excitation solid-state laser amplifier of the present invention.
Figure 28:
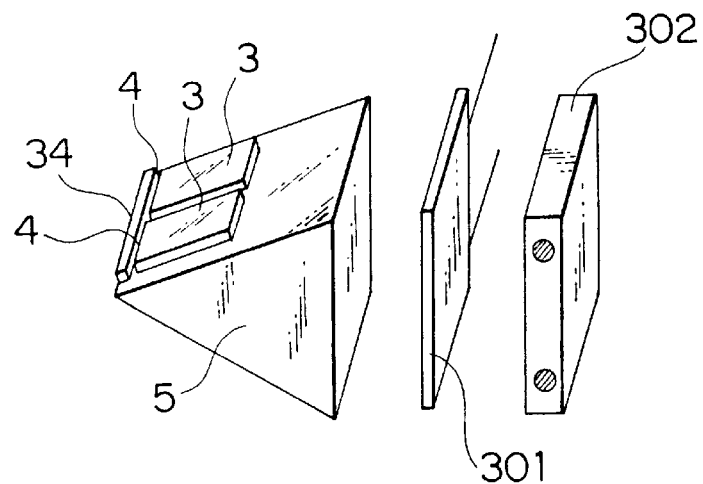
FIG. 28 is a block diagram of an excitation module used for a conventional diode laser excitation solid-state laser amplifier.
Figure 29:
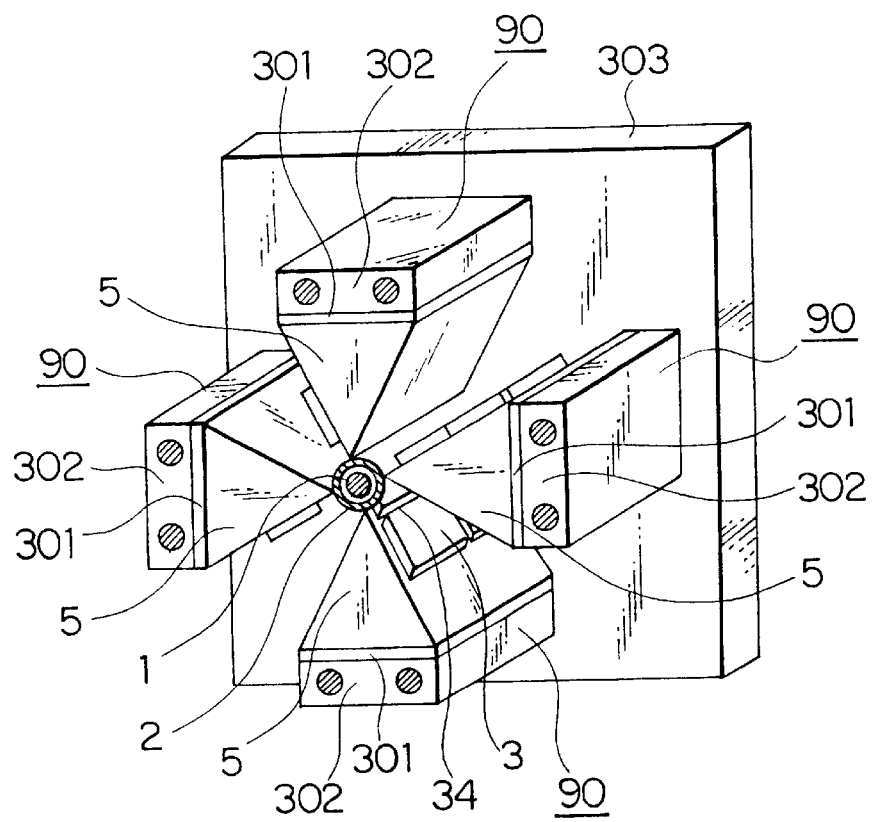
FIG. 29 is a perspective view showing the state in which an excitation module is fixed to a support plate together with a solid-state laser rod and a flow tube.

FIG. 2 is a local longitudinal sectional view. In FIGS. 1 and 2, a portion same as or equivalent to the portion of the conventional diode laser excitation solid-state laser amplifier shown in FIG. 28 is provided with the same symbol and its description is omitted. In FIG. 1 a pair of side plates 12 are vertically set at the both ends of a bottom plate 14. The side plates 12 support the solid-state laser rod 1 by passing the both end of the solid-state laser rod 1 through holes formed on their principal planes. The flow tube 2 is set around the solid-state laser rod 1. The flow tube 2 is cylindrical and entirely encloses the solid-state laser rod 1 in the longitudinal direction. The both ends of the flow tube 2 are also supported by the side plates 12. An inflow port 51 connected to the flow tube 2 to supply a cooling medium such as demineralized water is formed on one side plate 12. Moreover, a discharge port 52 for discharging a cooling medium is formed on the other side plate 12. The cooling medium supplied from the inflow port 51 flows through a space formed between the solid-state laser rod 1 and the flow tube 2 to directly cool the solid-state laser rod 1 during flowing. The cooling medium passing through the flow tube 2 is discharged from the discharge port 52.

A substrate 9 is constituted with a disk and a circular flange protruded from the whole margin of the disk perpendicularly to the disk surface and a hole is formed at the center of the disk. A plurality of substrates 9 are superposed in the same direction by passing the solid-state laser rod 1 and the flow tube 2 through the central hole. Four fixing blocks 10 are fixed to the principal plane of each substrate 9 about the central hole at equal intervals separately from each other by 90°. Four diode laser arrays 3 are fixed to the fixing blocks 10 by respectively sandwiching the heat sink 5. The diode laser array 3 is an excitation light source in which a plurality of light emitting elements are arranged. The fixing block 10 constitute means for fixing the diode laser array 3 serving as an excitation light source. The diode laser arrays 3 turn their light emitting section 4 toward the solid-state laser rod 1 and are fixed so as to form an angle of 90° with respect to each other by using the central axis of the solid-state laser rod 1 as a rotation axis. The substrate 9, four fixing blocks 10, diode laser arrays 3, and heat sinks 5 constitute one excitation module 100.

A connecting through-hole 11 is formed at the flange section of the substrate 9 perpendicularly to the principal plane. Moreover, a fixing through-hole 13 is formed on the side plate 12. A plurality of excitation modules 100 are connected to each other and fixed to the side plate 12 by passing a bolt 15 through the connecting through-hole 11 formed on the flange section of each substrate 9 and tightening the bolt 15 to a nut 16. The bolt 15 and the nut 16 constitute connecting and fixing means for connecting a plurality of excitation modules 100 arranged along the solid-state laser rod 1 to each other and fixing them to the side plate 12. Four connected excitation modules 100 constitute an excitation section as a whole.

In the case of the diode laser excitation solid-state laser amplifier of this embodiment, four diode laser arrays 3 are fixed to the substrate 9 through the fixing block 10 in one excitation module 100. Moreover, the amplifier of this embodiment is constituted so that the solid-state laser rod 1 and the flow tube 2 passthrough the central portion of the substrate 9. Furthermore, the light emitting sections 4 of the four diode laser arrays 3 fixed to the substrate 9 are all turned toward the center of the substrate on which the solid-state laser rod 1 is set. The excitation light emitted from the diode laser array 3 is applied to the solid-state laser rod 1 to excite the solid-state laser rod 1. In the excited solid-state laser rod 1, population inversion occurs between specific energy levels corresponding to the wavelength of the excitation light or the atomic structure of the active medium and the light having a wavelength corresponding to the energy difference between the levels receives an amplification action when passing through the solid-state laser rod 1 and thereby, the light intensity increases.

The margin of the substrate 9 is a circular flange having a thickness larger than that of the central portion and four connecting through-holes 11 are formed at equal intervals. The fixing through-hole 13 on the side plate 12 is set to a position corresponding to the connecting through-hole 11 of the excitation module 100. Because the bolt 15 is passed through the through-hole 11 formed on the substrate 9 and the fixing through-hole 13 formed on the side plate 12 and tightened by the nut 16, the excitation modules 100 are connected each other and fixed to the side plate 12.

In the case of this embodiment, because the connecting through-hole 11 is formed on the substrate 9 constituting the excitation module 100 and the bolt 15 is passed through the connecting through-hole 11 and tightened to the side plate 12 by the nut 16, the excitation modules 100 are accurately, easily, and firmly connected and fixed at the normal setting position. Moreover, because the setting position and angle of the excitation module 100 are specified by the connecting through-hole 11, the excitation section is easily fabricated and adjusted. Furthermore, even if disturbance such as mechanical vibration occurs, it is possible to keep the deviation of the excitation module 100 from the normal setting position or setting angle in the range of the diameter difference between the bolt 15 and the connecting through-hole 11. Therefore, It is possible to obtain a stable amplification characteristic and moreover, obtain a stable laser output.

Moreover, as shown in this embodiment, by setting a mechanism such as the connecting through-hole 11 for connecting excitation modules to each other, to the substrate 9 constituting the excitation module 100, it is possible to easily increase or decrease the number of excitation modules 100 constituting an excitation section. Therefore, it is possible to control the number of excitation modules 100 to be connected to each other in accordance with a purposed amplification characteristic or laser output.

Furthermore, because the excitation module 100 of this embodiment is constituted by setting four diode laser arrays 3 and the fixing block 10 on the single substrate 9, it is possible to keep the positional relation between the four diode laser arrays 3 always constant. Therefore, even if a disturbance such as vibration occurs, it is possible to control the deviation between the positions or setting angles of the four diode laser arrays. Thus, it is possible to uniformly excite the solid-state laser rod 1.

Furthermore, the diode laser excitation solid-state laser amplifier of this embodiment is constituted so as to fix the solid-state laser rod 1, flow tube 2, and excitation modules 100 by the side plate. Therefore, it is possible to easily set the solid-state laser rod 1, flow tube 2, and excitation modules 100 at an accurate positional relation each other.

Furthermore, the solid-state laser rod 1, flow tube 2, and excitation modules 100 are fixed by the same side plate 12. Therefore, it is possible to keep the positional relation between the solid-state laser rod 1, flow tube 2, and excitation modules 100 always constant. Therefore, even if a disturbance such as vibration occurs, it is possible to control the relative position and the deviation from a setting angle between the solid-state laser rod 1, flow tube 2, and excitation modules 100. Moreover, because the excitation modules 100 do not apply a mechanical load to the solid-state laser rod 1 or tube 2, not only the reliability of the amplifier is extremely improved but also a stable amplification characteristic, and in turn a stable laser output, can be obtained.

In this embodiment, a case is shown in which four connecting through-holes 11 are formed on the substrate 9. However, the number of connecting through-holes 11 formed on the substrate 9 is not restricted to 4. For example, by forming three connecting through-holes 11 it is possible to decrease the number of fabrication steps. Moreover, by forming four or more connecting through-holes 11, it is possible to more firmly connect the excitation modules 100 to each other.

Figure 3:
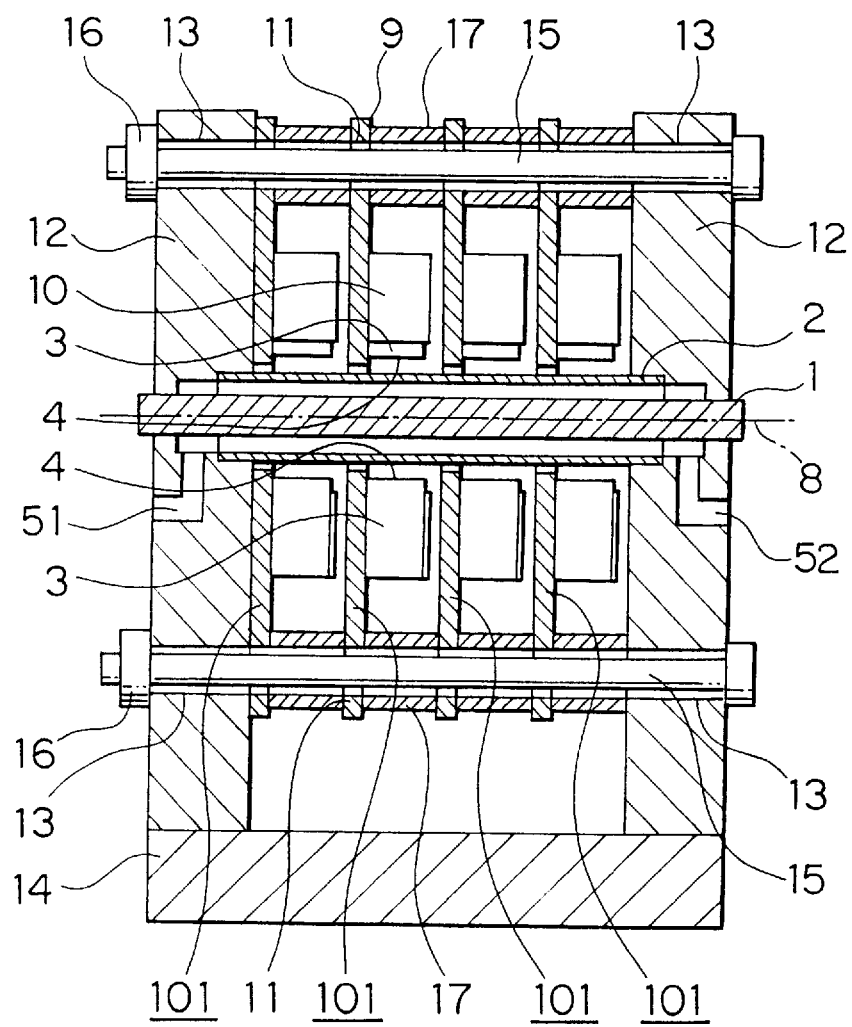
FIG. 3 is a traverse sectional view showing another embodiment of a diode laser excitation solid-state laser amplifier of the present invention.
Figure 4:
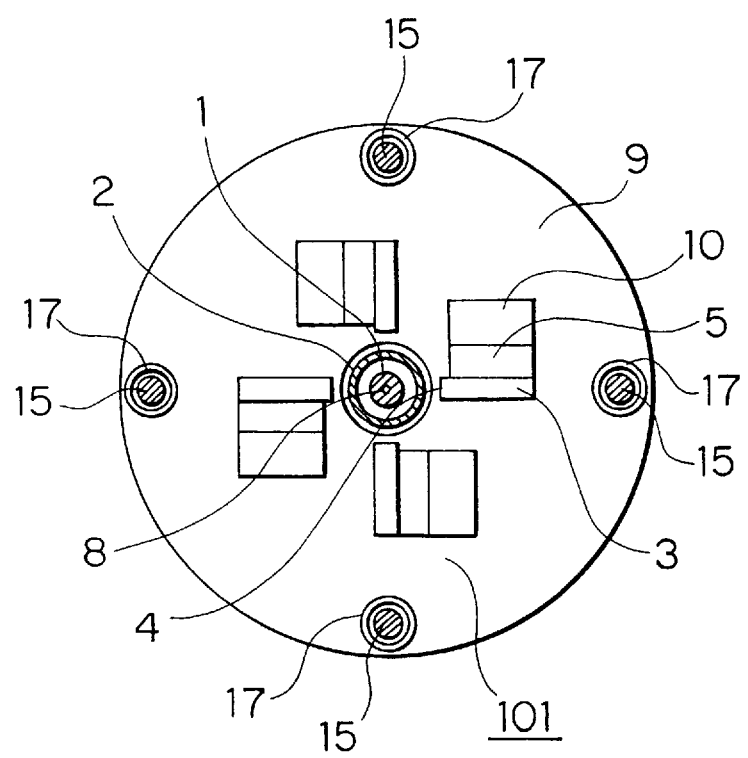
FIG. 4 is a local longitudinal sectional view showing another embodiment of a diode laser excitation solid-state laser amplifier of the present invention.

Embodiment 2:

FIG. 3 is a transverse sectional view showing another embodiment of a diode laser excitation solid-state laser amplifier of the present invention. FIG. 4 is a local sectional view. In the case of the diode laser excitation solid-state laser amplifier of this embodiment, an excitation module 101 comprises a cylindrical spacer 17 having a through-hole at its center in addition to a substrate 9, fixing block 10, diode laser array 3, and heat sink 5.

The shape of the substrate 9 of this embodiment is different from that of the embodiment 1, which is formed into not a circular flange which is thicker than the margin but formed into a flat plate. Moreover, the spacer 17 is set to a position corresponding to a connecting through-hole 11. The connecting through-hole 11 formed on the substrate 9, a through-hole formed on the spacer 17, and a fixing through-hole 13 formed on a side plate 12 are linearly arranged, and a bolt 15 passes through them and is tightened by a nut 16. Thereby, excitation modules 101 are connected each other and fixed to the side plate 12. The interval between the excitation modules 101 is specified by the spacer 17.

Also in the case of this embodiment, four excitation modules 101 are arranged in series along a solid-state laser rod 1. The method of fixing the diode laser array 3 serving as an excitation light source on the substrate 9 and the method of fixing the solid-state laser rod 1 and a flow tube 2 by the side plate 12 are the same as the case of the embodiment 1.

In the case of this embodiment, because the substrate 9 is constituted with a flat plate and the interval between the excitation modules 101 is specified by the spacer 17, the advantages same as those of the embodiment 1 can be obtained and moreover, the substrate 9 can easily be fabricated and the diode laser array 3 can easily be fixed on the substrate 9. Furthermore, because it is unnecessary to form a flange around the substrate 9, it is possible to decrease the weight of excitation modules. It is needless to say that the number of connecting through-holes 11 and the number of spacers 17 are not restricted to four.

Figure 5:
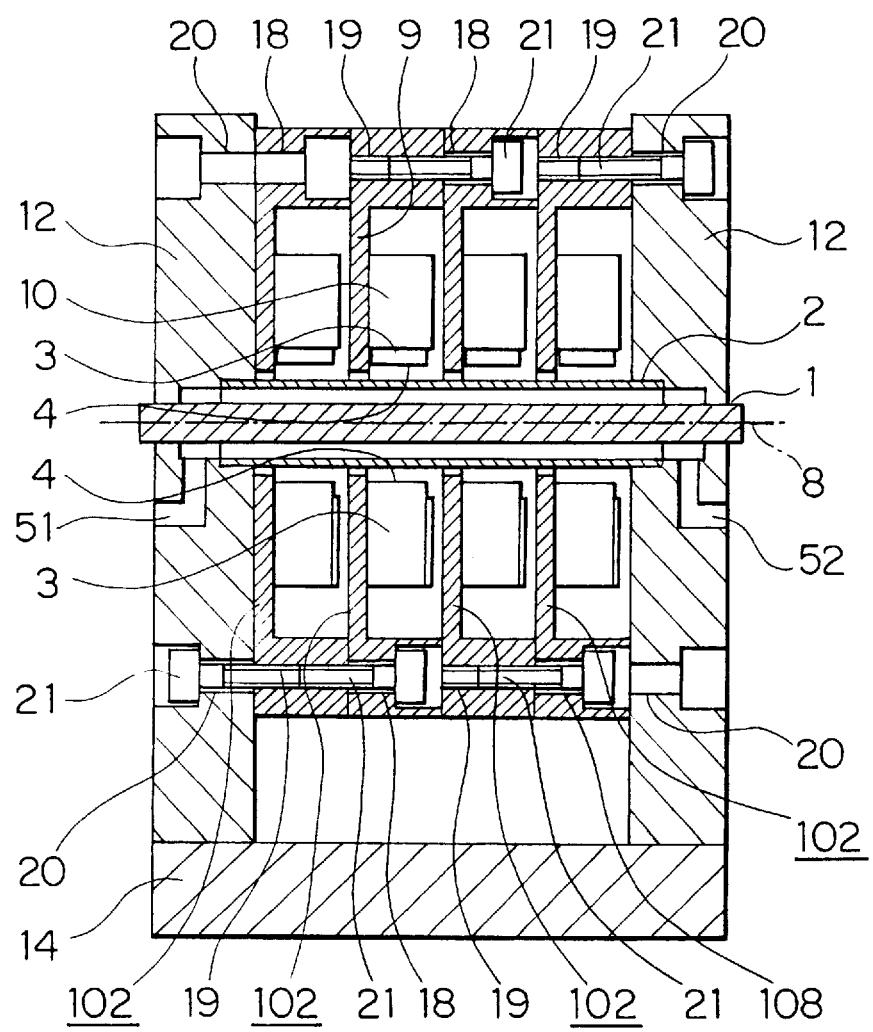
FIG. 5 is a transverse sectional view showing still another embodiment a diode laser excitation solid-state laser amplifier of the present invention.
Figure 6:
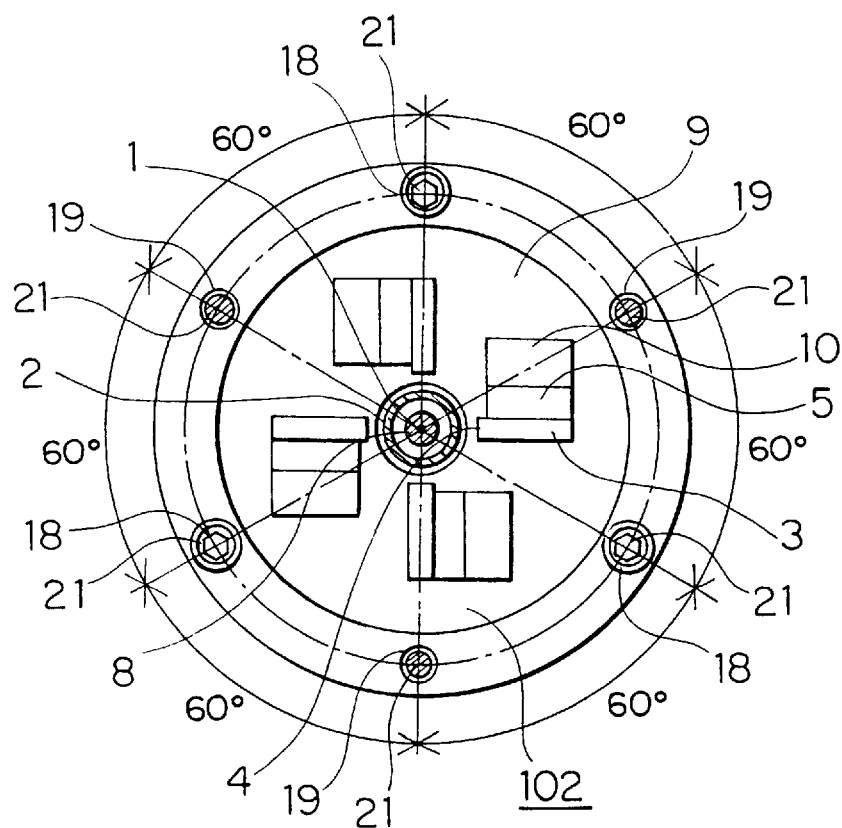
FIG. 6 is a local longitudinal sectional view showing still another embodiment a diode laser excitation solid-state laser amplifier of the present invention.

Embodiment 3:

FIG. 5 is a transverse sectional view showing still another embodiment of a diode laser excitation solid-state laser amplifier of the present invention. FIG. 6 is a local sectional view. In the case of this embodiment, a circular flange is formed at the margin of a substrate 9 and a counterbore-provided connecting through-hole 18 and a connecting tapped hole 19 are formed on the circular flange vertically to the principal plane of the substrate 9. Moreover, a counterbore-provided fixing through-hole 20 is formed on a side plate 12. Furthermore, each excitation module 102 and the side plate 12 are connected to each other and fixed by a hexagon socket head cap bolt 21. The hexagon socket head cap bolt 21 is connecting and fixing means for connecting and fixing each excitation module 102 and the side plate 12. The method of fixing a diode laser array 3 serving as an excitation light source to the substrate 9 is the same as the case of the embodiment 1.

Also in the case of this embodiment, the excitation module 102 comprises the substrate 9, a fixing block 10, and the diode laser array 3 and four excitation modules 102 are arranged in series along a solid-state laser rod 1.

As shown in FIG. 6, the counterbore-provided connecting through-hole 18 and the connecting tapped hole 19 formed on the substrate 9 are alternately arranged at an angle of 60° on the same circle having the same center as the solid-state laser rod 1. Therefore, a triangle formed on the substrate 9 by connecting the centers of three counterbore-provided connecting through-holes 18 and a triangle formed by connecting the centers of three connecting tapped holes 19 are congruent equilateral triangles. The counterbore diameter of the counterbore-provided connecting through-hole 18 is made larger than the diameter of the bolt head of the hexagon socket head cap bolt 21 corresponding to a connecting tapped hole and the counterbore depth of the hole 18 is made deeper than the height of the bolt head of the bolt 21.

As shown in FIG. 5, the excitation modules 102 are successively connected to each other rightward by adjusting the position of the counterbore-provided connecting through-hole 18 of the next excitation module 102 to the connecting tapped hole 19 of the excitation module 102 and using the hexagon socket head cap bolt 21. Because the counterbore-provided connecting through-hole 18 and connecting tapped hole 19 formed at the margin of the substrate 9 are set on the same circle having the same center as the solid-state laser rod 1, it is possible to keep the positional relation between the solid-state laser rod 1 and the diode laser array 3, serving as an excitation light source, constant. Moreover, the counterbore-provided connecting through-hole 18 formed at the margin of the substrate 9 and a plurality of counterbore-provided fixing through-holes 20 having the positional relation with the connecting tapped hole 19 are formed on the side plate 12, the substrates 9 at the both ends are brought into close contact with the side plate 12, the hexagon socket head cap bolt 21 is passed through the counterbore-provided fixing through-hole 20 located on the connecting tapped hole 19, and the substrate 9 is combined with the excitation module 102.

In the case of this embodiment, because an individual excitation module 102 is firmly connected with the adjacent excitation module 102 and fixed even when a plurality of excitation modules 102 are arranged in series, it is possible to further increase the resistance against a disturbance such as vibration. Moreover, because the step of connecting the excitation modules 102 one by one is performed at the time of fabrication, it is possible to improve the fabrication accuracy. Furthermore, because it is unnecessary to use a long bolt when connecting many excitation modules 102. Furthermore, because the fabrication procedure of previously connecting the excitation modules 102 to each other and finally combining an excitation section with the side plate 12 can be performed, the independency of the excitation section is improved and it is possible to reduce a load such as excitation section replacement.

In the case of this embodiment, a structure is shown in which the counterbore-provided connecting through-holes 18 formed on the substrate 9 and the connecting tapped holes 19 are alternately and uniformly arranged on the same circle having the same center as the solid-state laser rod 1 at an angle of 60°. However, the number of counterbore-provided connecting through-holes 18 and the number of connecting tapped holes 19 are not restricted to the case of this embodiment. When a polygon formed on the same circle and by connecting the centers of the counterbore-provided connecting through-holes 18 is congruent with a polygon formed by connecting the centers of the connecting tapped holes 19, it is possible to keep the positional relation between the diode laser array 3 and the solid-state laser rod 1 constant and moreover, firmly connect the adjacent excitation modules 102 to each other and fix them.

Figure 7:
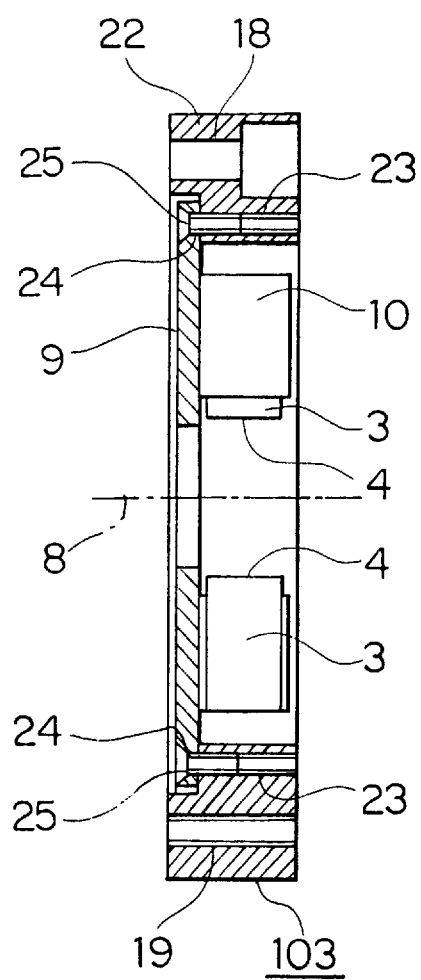
FIG. 7 is a transverse sectional view showing still another embodiment a diode laser excitation solid-state laser amplifier of the present invention.

Embodiment 4:

FIG. 7 is a transverse sectional view of an excitation module showing still another embodiment of a diode laser excitation solid-state laser amplifier of the present invention. In FIG. 7, an annular connecting flange 22 is set at the margin of a substrate 9. Moreover, a flange fixing tapped hole 23 used to fix the connecting flange 22 and a flange fixing through-hole 24 are formed on the connecting flange 22 and the substrate 9 respectively. Furthermore, a flat countersunk head screw 25 for connecting the connecting flange 22 with the substrate 9 is tightened to them. The method of fixing the diode laser array 3 serving as an excitation light source to the substrate 9 is the same as the case of the embodiment 1. Furthermore, a counterbore-provided connecting through-hole 18 and a connecting tapped hole 19 having the same structure as the embodiment 3 are formed on the connecting flange 22 and the method of connecting excitation modules to each other is the same as the method shown for the embodiment 3.

The structure of an excitation module 103 of this embodiment is different from those of the embodiments 1 and 3. That is, the connecting flange 22 on which the counterbore-provided connecting through-hole 18 and the connecting tapped hole 19 are formed is not integrated with the substrate 9. A flange fixing through-hole 24 formed at the margin of the substrate 9 and the fixing tapped hole 23 formed on the connecting flange 22 are tightened by the flat countersunk head screw 25 and the substrate 9 is combined with the connecting flange 22.

In the case of this embodiment, the diode laser array 3 is fixed to the flat substrate 9 and thereafter, the substrate 9 is mounted on the connecting flange 22. Therefore, similarly to the structure of the embodiment 3, the excitation modules 103 can firmly be connected each other by using the counterbore-provided connecting through-hole 18 and the connecting tapped hole 19 formed on the connecting flange 23 and moreover, the substrate 9 can easily be set to the diode laser array 3 because the substrate 9 is flat.

This embodiment has a structure in which the flange fixing through-hole 24 is formed at the margin of the substrate 9 and the flange fixing tapped hole 23 is formed on the connecting flange 22. However, it is needless to say that the same advantage can be obtained by forming a flange fixing tapped hole on the substrate 9 side and a flange fixing through-hole on the connecting flange 22 side and fixing the substrate 9 by screws from the connecting flange 22 side.

Moreover, in the case of this embodiment, a structure is shown in which the counterbore-provided connecting through-hole 18 and the connecting tapped hole 19 are formed on the connecting flange 23. However, the same advantage can also be obtained by forming a connecting through-hole 11 same as the structure of the embodiment 1 on the connecting flange 23 and connecting excitation modules to each other and fixing them to the side plate 12 with the bolt 15 and the nut 16.

Figure 8:
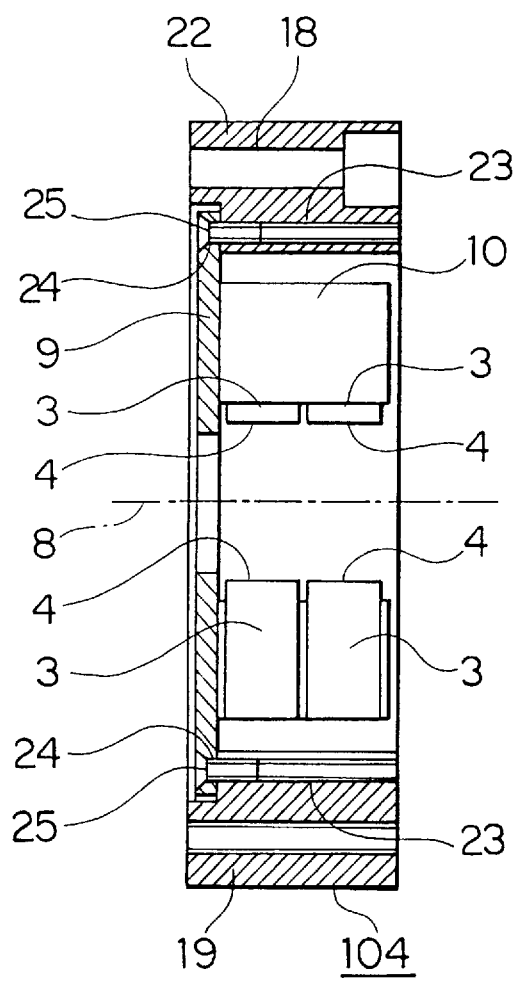
FIG. 8 is a transverse sectional view showing still another embodiment a diode laser excitation solid-state laser amplifier of the present invention.

Embodiment 5:

FIG. 8 is a transverse sectional view of an excitation module showing still another embodiment of a diode laser excitation solid-state laser amplifier of the present invention. In the case of an excitation module 104 of this embodiment in FIG. 8, two diode laser arrays 3 are superposed on and fixed to a fixing block 10 set on a substrate 9 in parallel with an optical axis 8. Other structures are the same as those of the embodiment 4. Because a plurality of diode laser arrays 3 are fixed to one fixing block 10, it is possible to increase the number of diode laser arrays 3 which can be mounted on a solid-state laser rod 1 for its unit length. Moreover, it is possible to firmly connect excitation modules by a counterbore-provided connecting through-hole 18 and a connecting tapped whole 19 formed at the margin of the substrate 9 and moreover, downsize the whole of the diode laser excitation solid-state laser amplifier while keeping the same amplification performance.

In the case of this embodiment, two diode laser arrays 3 are fixed to the fixing block 10 in parallel with the optical axis 8. However, the number of diode laser arrays 3 to be fixed to the fixing block 10 is not restricted to two.

Figure 9:
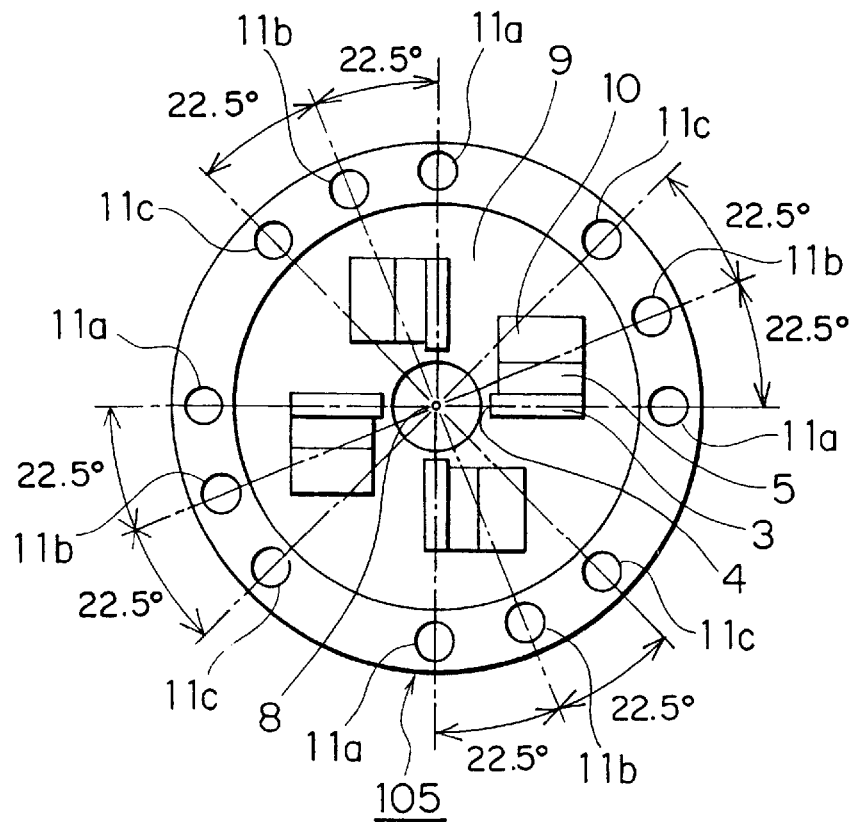
FIG. 9 is a front view of an excitation module showing still another embodiment of a diode laser excitation solid-state laser amplifier of the present invention.

Embodiment 6:

FIG. 9 is a front view of an excitation module showing still another embodiment of a diode laser excitation solid-state laser amplifier of the present invention. In the case of an excitation module 105 of this embodiment, three sets of connecting through-holes 11a, 11b, and 11c respectively consisting of four connecting through-holes separately arranged every 90° are formed on a circular flange at the margin of a substrate 9. Any connecting through-hole among the three sets of connecting through-holes 11a, 11b, and 11c is formed on the same circle. Moreover, the connecting through-hole 11b is formed at a position of 22.5° counterclockwise to the connecting through-hole 11a and the connecting through-hole 11c is formed at a position of 22.5° counterclockwise to the connecting through-hole 11b. The method of fixing a diode laser array 3 to the substrate 9 is the same as the case of the embodiment 1. When the excitation module 105 of this embodiment is actually set in a diode laser excitation solid-state laser amplifier, a structure is used in which a solid-state laser rod 1 and a flow tube 2 pass through the central portion of the excitation module 105 shown in FIG. 9 in the direction vertical to the paper surface.

In the case of this embodiment, when the first excitation module 105 is connected with the second excitation module 105, the first excitation module 105 uses the connecting through-hole 11a and the second excitation module 105 uses the connecting through-hole 11b. The first and second excitation modules 105 are connected each other by passing a bolt 15 through them similarly to the case of the embodiment 1. Therefore, the setting direction of the diode laser array 3 of the first excitation module 105 is deviated from the setting direction of the diode laser array 3 of the second excitation module 105 by 22.5° about the central axis of the solid-state laser rod 1.

Figure 10:
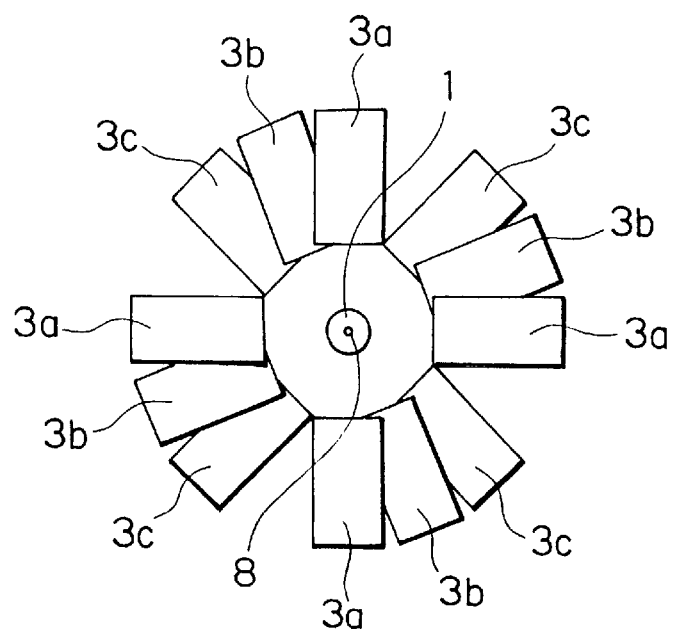
FIG. 10 is a schematic view showing setting positions of diode laser arrays.

FIG. 10 is a schematic view showing the setting positions of a diode laser array 3a in the first excitation module 105, a diode laser array 3b in the second excitation module 105, and a diode laser array 3c in the third excitation module 105.

In the case of this embodiment, the excitation modules 105 can easily and firmly be connected to each other and moreover, adjacent excitation modules 105 can be connected to each other at a different setting angle. Therefore, it is possible to improve the uniformity of an excitation distribution in the solid-state laser rod 1 by applying excitation light to the rod 1 from various directions.

In the case of this embodiment, connecting through-holes 11 are formed at the margin of the substrate 9 at an interval of 22.5°. However, the angle interval for arranging the connecting through-holes 11 and the number of connecting through-holes 11 are not restricted to those of this embodiment. It is possible to select them in accordance with the number of excitation modules to be connected each other or the arrangement of diode laser arrays fixed in excitation modules so that an optimum excitation distribution can be obtained.

Figure 11:
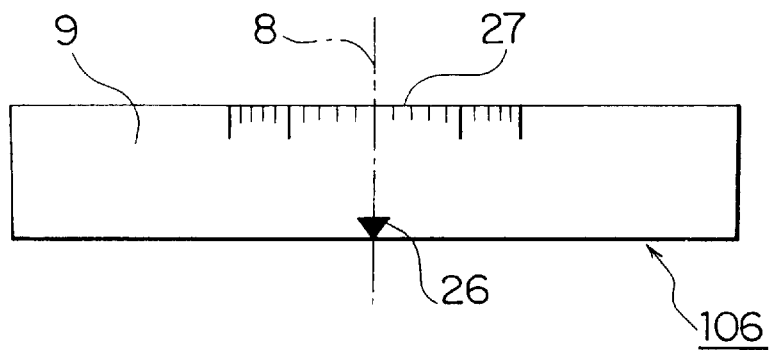
FIG. 11 is a side view of an excitation module showing still another embodiment of a diode laser excitation solid-state laser amplifier of the present invention.
Figure 12:
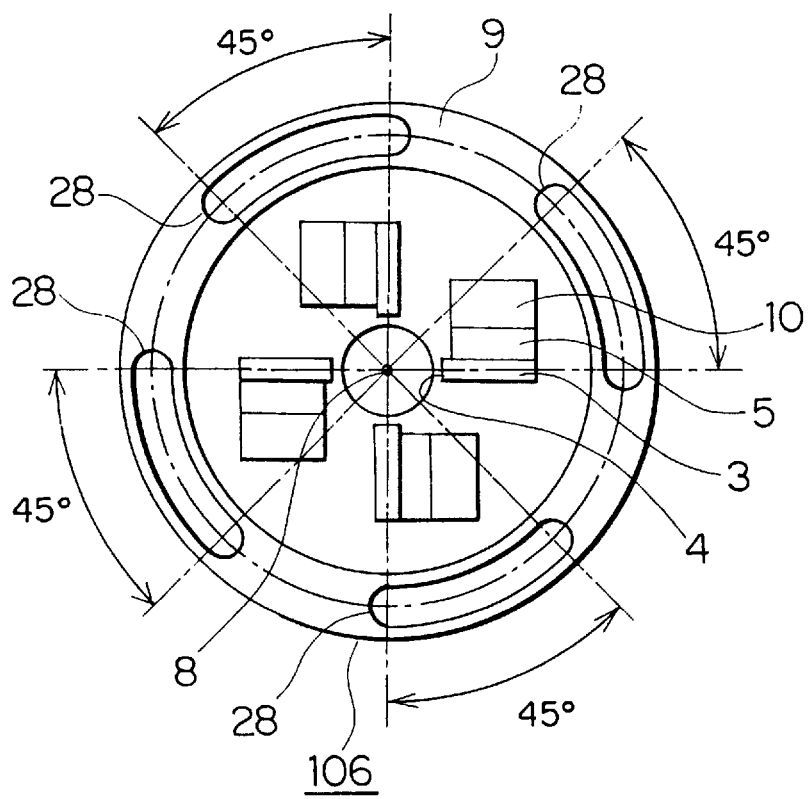
FIG. 12 is a front view of an excitation module showing still another embodiment of a diode laser excitation solid-state laser amplifier of the present invention.

Embodiment 7:

FIG. 11 is a side view of an excitation module showing still another embodiment of a diode laser excitation solid-state laser amplifier of the present invention. FIG. 12 is a front view. In FIG. 11, a mark 26 serving as the reference of setting angles is drawn at the lateral of an excitation module 106. Moreover, a scale 27 showing a deviation angle from the mark 26 is drawn. Furthermore, a segmental slot 28 is formed on the circular flange at the margin of a substrate 9. The method of fixing a semiconductor laser array 3 to the substrate 9 is the same as the case of the embodiment 1. When the excitation module 106 of this embodiment is actually set in a semiconductor laser excitation solid-state laser amplifier, a structure is used in which a solid-state laser rod 1 and a flow tube 2 pass through the central portion of the excitation module 106 shown in FIG. 12 in the direction vertical to the paper surface.

In the case of the excitation module 106 of this embodiment, four segmental slots 28 formed so as to have the same center are formed at the margin of the substrate 9. Moreover, the excitation modules 106 are connected to each other by passing a bolt through the slot 28. The excitation modules 106 are connected to each other and fixed to a side plate 12 by tightening them with a bolt 15 and a nut 16 similarly to the case of the embodiment 1.

In the case of this embodiment, because the setting angles between adjacent excitation modules 106 can continuously be changed, it is possible to finely adjust an excitation distribution. Moreover, because the four segment slots 28 formed on the substrate 9 have the same center, it is possible to keep the positional relation between the solid-state laser rod 1 and the diode laser array 3 constant without depending on the setting angle of the excitation module 106. Furthermore, because the mark 26 serving as the angle reference of the excitation modules 106 and the scale 27 showing a deviation angle from the mark 26 are set at the lateral of each excitation module 106, it is possible to immediately recognize the relative setting angle difference between adjacent excitation modules and easily set the setting angle between excitation modules.

In the case of this embodiment, a case is shown in which four segmental slots 28 are set to the substrate 9 of excitation modules. However, the number of slots 28 to be formed on the substrate 9 is not restricted to four.

Figure 13:
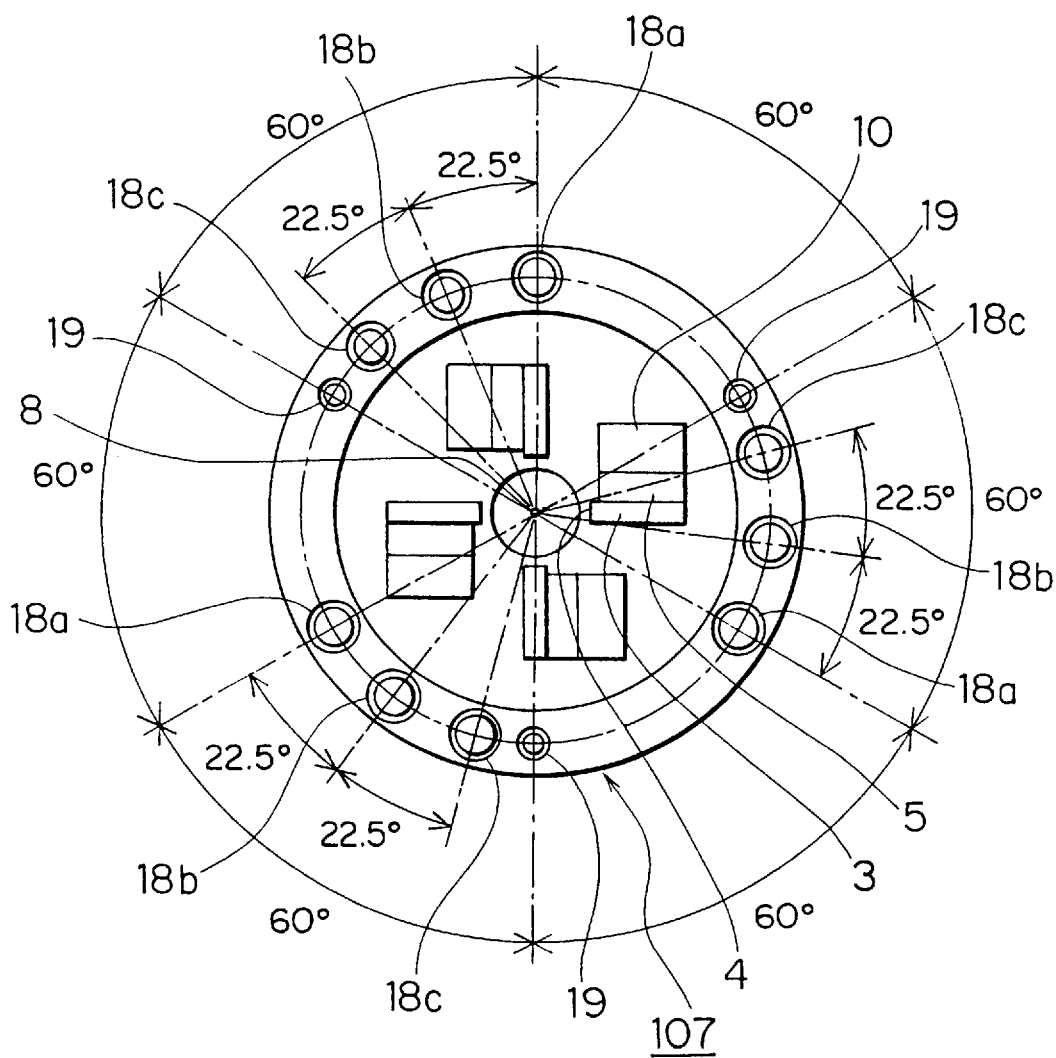
FIG. 13 is a front view of an excitation module showing still another embodiment of a diode laser excitation solid-state laser amplifier of the present invention.

Embodiment 8:

FIG. 13 is a front view of an excitation module showing still another embodiment of a diode laser excitation solid-state laser amplifier of the present invention. In the case of this embodiment, three sets of counterbore-provided connecting through-holes 18a, 18b, and 18c respectively consisting of three counterbore-provided connecting through-holes and a connecting tapped hole 19 which are separately arranged every 120° are formed on a circular flange at the margin of a substrate 9. The connecting through-holes 18a, 18b, and 18c and the connecting tapped hole 19 are formed on the same circle. The counterbore-provided connecting through-hole 18a which is one of the three sets of connecting through-holes with a counterbore and the connecting tapped hole 19 are alternately arranged at an angle of 60°. Moreover, the connecting through-hole 18b with a counterbore is formed at a position of 22.5° counterclockwise to the counterbore-provided connecting through-hole 18a and the counterbore-provided connecting through-hole 18c is formed at a position of 22.5° counterclockwise to the counterbore-provided connecting through-hole 18b. Therefore, each triangle formed by connecting the centers of the counterbore-provided connecting through-holes 18a, 18b, and 18c is an equilateral triangle having three equal sides. Moreover, these triangles are congruent with an equilateral triangle formed by connecting the centers of three connecting tapped holes 19.

The method of fixing a diode laser array 3 serving as an excitation light source to the substrate 9 is the same as the case of the embodiment 1. When an excitation module 107 of this embodiment is actually set to a diode laser excitation solid-state laser amplifier, a structure is used in which a solid-state laser rod 1 and a flow tube 2 pass through the central portion of the excitation module 107 in the direction vertical to the paper surface.

The excitation modules 107 of this embodiment are connected to each other by the same method as the case of the embodiment 3, the position of the connecting tapped hole 19 of one excitation module 107 is adjusted to the position of any one of the counterbore-provided through-holes 18a, 18b, and 18c of the other excitation module 107, and the both excitation modules 107 are tightened with a hexagon socket head cap bolt. Because each excitation module 107 of this embodiment is provided with three sets of connecting through-holes 18a, 18b, and 18c at an interval of 22.5°, it is possible to set the setting angle difference between adjacent excitation modules 107 to an interval of 22.5° by selecting a counterbore-provided connecting through-hole out of three sets of counterbore-provided connecting through-holes.

In the case of this embodiment, it is possible to firmly connect adjacent excitation modules 107 to each other and moreover, the setting angles between adjacent excitation modules 107 can be changed by selecting a counterbore-provided connecting through-hole out of the three sets 18a, 18b, and 18c. Therefore, it is possible to excite the solid-state laser rod 1 from various directions and improve the uniformity of an excitation distribution in the solid-state rod 1.

Figure 14:
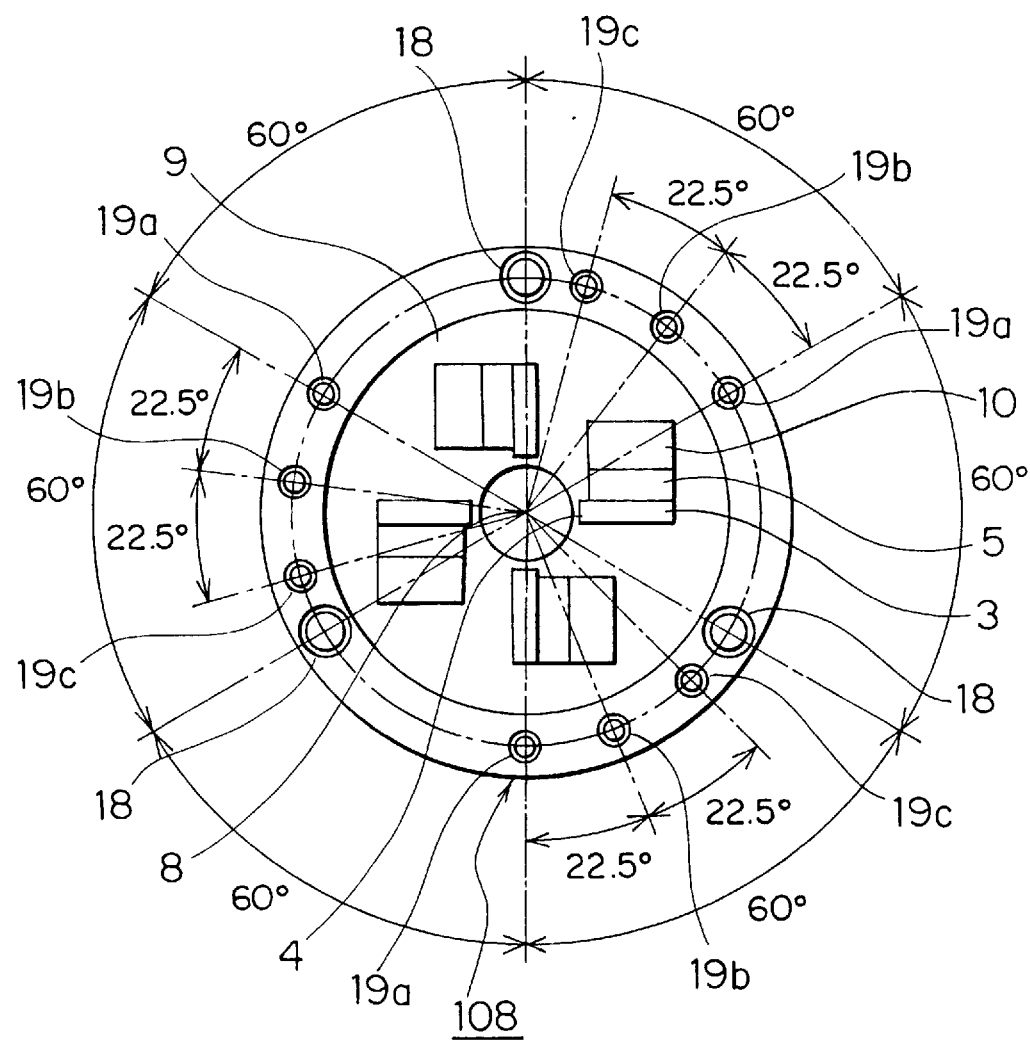
FIG. 14 is a front view of an excitation module showing still another embodiment of a diode laser excitation solid-state laser amplifier of the present invention.

Embodiment 9:

FIG. 14 is a front view of an excitation module showing still another embodiment of a diode laser excitation solid-state laser amplifier of the present invention. In the case of the embodiment 8, the counterbore-provided connecting through-holes 18a, 18b, and 18c respectively consisting of three counterbore-provided connecting through-holes are formed at the margin of the substrate 9 at an interval of 22.5°. In the case of this embodiment, however, a set of three counterbore-provided connecting through-holes 18 and connecting tapped holes 19a, 19b, and 19c are formed. The counterbore-provided connecting through-hole 18 and the connecting tapped holes 19a, 19b, and 19c are formed on the same circle and the counterbore-provided connecting through-hole 18 and the connecting tapped hole 19a which is one of the three sets of connecting tapped holes are alternately arranged at an angle of 60°. The connecting tapped hole 19*b* is formed at a position of 22.5° counterclockwise to the 19*a* and the connecting tapped hole 19*c* is formed at a position of 22.5° counterclockwise to the 19*b*. Therefore, each triangle formed by connecting the centers of the connecting tapped holes 18*a*, 18*b*, and 18*c* is an equilateral triangle having three equal sides. Moreover, these triangles are congruent with a triangle formed by connecting the centers of three connecting through-holes 18.

The method of fixing a diode laser array 3 serving as an excitation light source to the substrate 9 is the same as the case of the embodiment 1. When an excitation module 108 of this embodiment is actually set in a diode laser excitation solid-state laser amplifier, structure is used in which a solid-state laser rod 1 and a flow tube 2 pass through the central portion of the excitation module 108 in the direction vertical to the paper surface.

In the case of this embodiment, when the excitation modules 108 are connected each other, any connecting tapped hole is selected out of three sets of connecting tapped holes 19*a*, 19*b*, and 19*c* formed at an interval of 22.5° and a counterbore-provided connecting through-hole 18 is adjusted to the selected connecting tapped hole, and the excitation modules are tightened by a hexagon socket head cap bolt. Therefore, adjacent excitation modules 108 are firmly connected to each other. Moreover, because the setting angles between adjacent excitation modules 108 can be changed at an interval of 22.5°, it is possible to apply excitation light to the solid-state laser rod 1 from various directions and obtain uniform excitation distribution in the solid-state laser rod 1.

In the case of this embodiment and the above embodiment 8, the connecting through-holes 18*a*, 18*b*, and 18*c* or the connecting tapped holes 19*a*, 19*b*, and 19*c* are formed at an interval of 22.5°. However, the angle interval of them and the number of them are not restricted to the case of this embodiment. They can be selected so that an optimum excitation distribution can be obtained for a purpose in accordance with the number of excitation modules to be connected each other or the arrangement of diode laser arrays to be fixed in excitation modules.

In the case of this embodiment and the above embodiment 8, a plurality of sets of counterbore-provided connecting through-holes with different setting angles are provided for a set of connecting tapped holes or a plurality of sets of connecting tapped holes with different setting angles are provided for a set of counterbore-provided connecting through-holes. However, if a plurality of sets of counterbore-provided connecting through-holes with different setting angles and a plurality of sets of connecting tapped holes with different setting angles can be formed on the same substrate, the same advantage as that of this embodiment or the embodiment 8. Moreover, it is possible to increase the number of options for setting angles of excitation modules.

Figure 15:
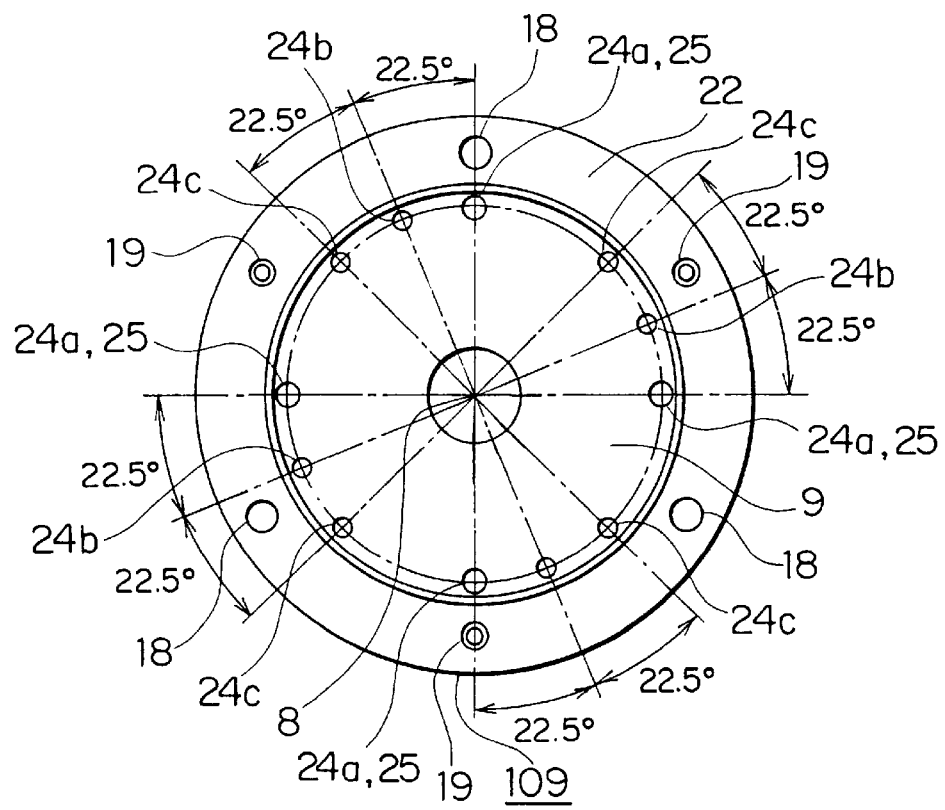
FIG. 15 is a front view of an excitation module showing still another embodiment of a diode laser excitation solid-state laser amplifier of the present invention.
Figure 16:
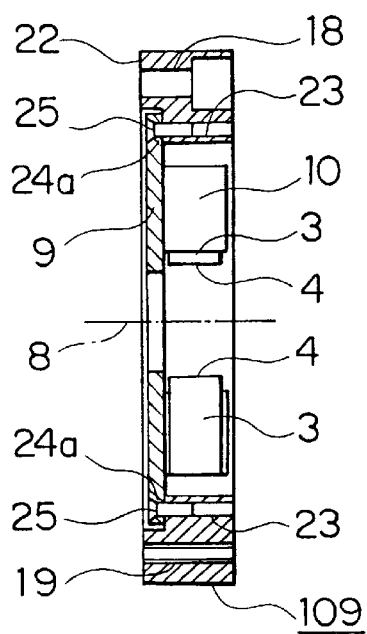
FIG. 16 is a sectional view of an excitation module showing still another embodiment of a diode laser excitation solid-state laser amplifier of the present invention.

Embodiment 10:

FIG. 15 is a front view of an excitation module showing still another embodiment of a diode laser excitation solid-state laser amplifier of the present invention. Moreover, FIG. 16 is a sectional view. In the case of the structure of an excitation module 109 of this embodiment, a connecting flange 22 is set at the margin of a substrate 9 formed with a flat plate similarly to the case of the embodiment 4. Three sets of flange fixing through-holes 24*a*, 24*b*, and 24*c* respectively consisting of four flange fixing through-holes separately arranged every 90° are formed at the margin of the substrate 9. Moreover, a flange fixing tapped hole 23 is formed at four positions fitted to the flange fixing through-hole 24*a* formed on the substrate 9. Furthermore, the substrate 9 is connected with the connecting flange 22 by a flat countersunk head screw 25 through the flange fixing through-hole 24*a*.

The flange fixing through-holes 24*a*, 24*b*, and 24*c* and the flange fixing tapped hole 23 are formed on the same circle. The flange fixing through-hole 24*b* formed on the substrate 9 is arranged at a position of 22.5° counterclockwise to the flange fixing through-hole 24*a* and the flange fixing through-hole 24*c* is arranged at a position of 22.5° counterclockwise to the flange fixing through-hole 24*b*. Therefore, quadrangles formed by the fact that the flange fixing through-holes 24*a*, 24*b*, and 24*c* respectively connect four centers are congruent to each other. The method of fixing a diode laser array 3 serving as an excitation light source to the substrate 9 is the same as the case of the embodiment 1.

When an excitation module 109 of this embodiment is actually set in a diode laser excitation solid-state laser amplifier, a structure is used in which a solid-state laser rod 1 and a flow tube 2 pass through the central portion of the excitation module 109 in the direction vertical to the paper surface. Moreover, a counterbore-provided connecting countersunk hole 18 and a connecting tapped hole 19 are formed on the connecting flange 22 and the method of connecting the excitation modules 109 to each other is the same as the case of the embodiment 3.

In the case of the excitation module 109 of this embodiment, three sets of flange fixing through-holes 24*a*, 24*b*, and 24*c* are formed on the substrate 9 at an angle interval of 22.5°. Therefore, by selecting a flange fixing through-hole to be used when connecting the substrate 9 with the flange 22, it is possible to set the setting angle of the substrate 9 at an angle interval of 22.5°. Therefore, in the case of the diode laser excitation solid-state laser amplifier of this embodiment, the setting angles of the substrate 9 to the connecting flange 22 of each excitation module 109 are changed when a plurality of excitation modules 109 are connected to each other and used. Thereby, it is possible to apply excitation light to the solid-state laser rod 1 from various directions and improve the uniformity of the excitation distribution in the solid-state laser rod 1. Moreover, because the connecting flange 22 is provided with the counterbore-provided connecting countersunk hole 18 and the connecting tapped hole 19, it is possible to firmly connect adjacent excitation modules 109 to each other.

This embodiment has a structure in which three sets of flange fixing through-holes 24*a*, 24*b*, and 24*c* respectively consisting of four flange fixing through-holes are formed on the substrate 9 at an angle interval of 22.5° and a set of connecting tapped holes 23 are formed at the connecting flange side. However, it is needless to say that the same advantage can be obtained from a structure in which a set of connecting through-holes 24 are formed at the substrate 9 side and a plurality of sets of connecting tapped holes 23 are formed at the connecting flange 22 side. Moreover, it is possible to form a structure in which a flange fixing through-hole 24 is formed at the connecting flange 22 side, the flange connecting through-hole 23 is formed at the substrate 9 side, and the substrate 9 is fixed from the connecting flange 22 side through the flange fixing through-hole 24.

In the case of this embodiment, three sets of flange fixing through-holes 24*a*, 24*b*, and 24*c* respectively consisting of four flange fixing through-holes and arranged at an angle interval of 22.5° are formed on the substrate 9. However, the angle interval when a plurality of sets of flange fixing through-holes 24 or a plurality of sets of flange fixing tapped holes 23 are formed is not restricted to 22.5°.

Figure 17:
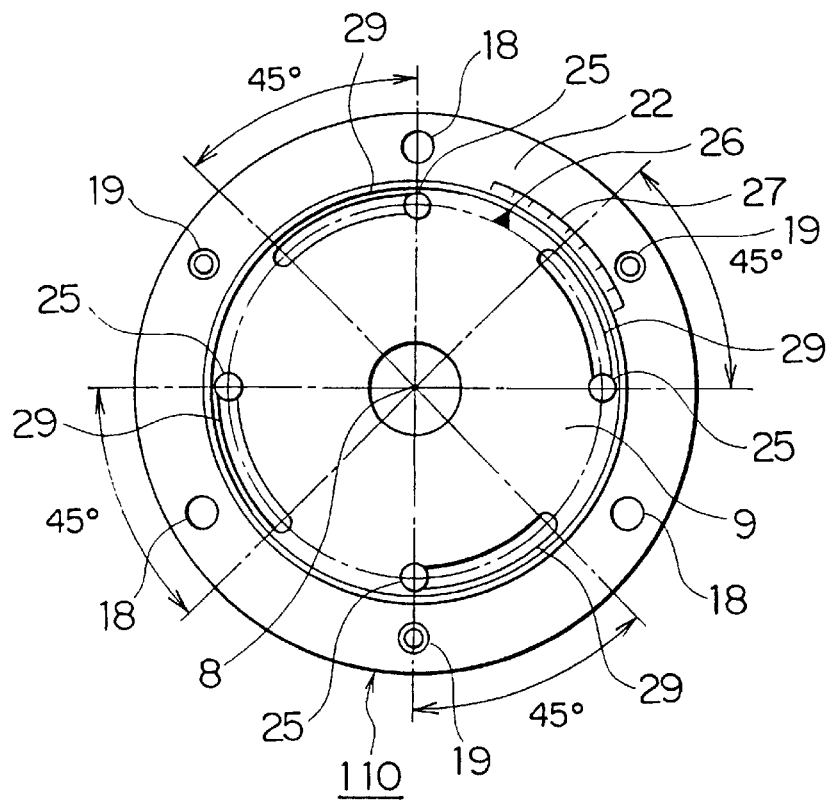
FIG. 17 is a front view of an excitation module showing still another embodiment of a diode laser excitation solid-state laser amplifier of the present invention.
Figure 18:
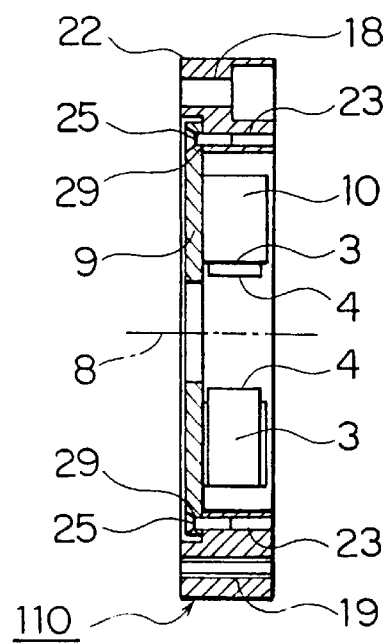
FIG. 18 is a sectional view of an excitation module showing still another embodiment of a diode laser excitation solid-state laser amplifier of the present invention.

Embodiment 11:

FIG. 17 is a front view of an excitation module showing still another embodiment of a diode laser excitation solid-state laser amplifier of the present invention. Moreover, FIG. 18 is a sectional view. In FIGS. 17 and 18, a segmental flange fixing slot 29 is formed at the margin of a substrate 9. An excitation module 110 of this embodiment also has a structure in which a connecting flange 22 is fixed at the margin of the substrate 9 formed with a flat plate similarly to the case of the embodiment 10. The method of fixing a diode laser array 3 serving as an excitation light source to the substrate 9 is the same as the case of the embodiment 1. When the excitation module 110 of this embodiment is actually set in a diode laser excitation solid-state laser amplifier, a structure is used in which a solid-state laser rod 1 and a flow tube 2 pass through the central portion of the excitation module 110 in the direction vertical to the paper surface. Moreover, a counterbore-provided connecting through-hole 18 and a connecting tapped hole 19 are formed on the connecting flange 22 and the method of connecting the excitation modules 110 to each other is the same as the case of the embodiment 3.

In the case of the excitation module 110 of this embodiment, four flange fixing slots 29 provided for the margin of a substrate 9 are formed so that all of them are located on the same circle. A flange fixing tapped hole 23 is formed at four places on the connecting flange 22. The connecting flange 22 is fixed at the margin of the substrate 9 by a flat countersunk head screw 25 through the flange fixing slot 29.

In the case of this embodiment, because it is possible to continuously change the setting angles of the substrate 9 to the connecting flange 22 while keeping the positional relation between the solid-state laser rod 1 and the diode laser array 3 serving as an excitation light source constant, fine adjustment of an excitation distribution can be performed. Moreover, a mark 26 showing the angle reference of the substrate 9 is provided for the margin of the substrate 9 and moreover, a scale 27 showing an angle is provided for a position facing the mark 26 provided for the substrate 9 on the connecting flange 22. Therefore, it is possible to quickly recognize the setting angle of the substrate 9 to the connecting flange 22 and the setting angle of the substrate 9 can easily be adjusted Because a counterbore-provided connecting countersunk hole 18 and a connecting tapped hole 19 are formed on the connecting flange 22, it is needless to say that adjacent excitation modules can firmly be connected to each other.

In the case of this embodiment, a structure is shown in which the flange fixing slots 29 whose centers are located at the same circle are formed at the margin of the substrate 9 and the flange fixing tapped hole 23 is formed on the connecting flange 22. However, it is also permitted that flange fixing slots 29 whose centers are located on the same circle are formed on the connecting flange 22, the flange fixing tapped hole 23 is formed at the margin of the substrate 9, and the substrate 9 is fixed from the connecting flange 22 side through the flange fixing slots 29. Also in this case, it is possible to continuously change the setting angles of the substrate 9 to the connecting flange 22 while keeping the positional relation between the solid-state laser rod 1 and the diode laser array 3 serving as an excitation light source constant.

In the case of the excitation modules of this embodiment and the above embodiment 10, the same method as the case of the embodiment 3 in which the counterbore-provided connecting countersunk hole 18 and connecting tapped hole 19 formed on the connecting flange 22 is used is shown as the method of connecting excitation modules to each other. However, the method of connecting excitation modules to each other is not restricted to the above method. For example, it is possible to use a method of forming connecting through-holes on the connecting flange 22.

Moreover, by adding means for changing the setting angles between the excitation modules shown in the embodiments 6 to 9 to the connecting flange 22, it is possible to further expand the adjusting range of the incident angle of excitation light to the solid-state laser rod 1.

Figure 19:
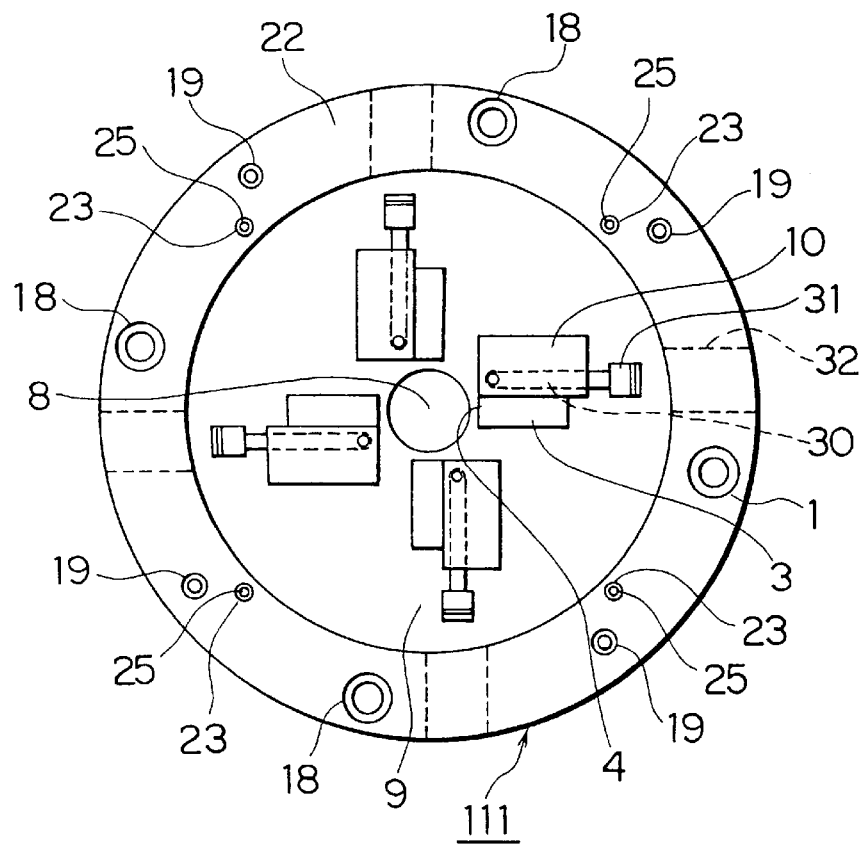
FIG. 19 is a front view of an excitation module showing still another embodiment of a diode laser excitation solid-state laser amplifier of the present invention.
Figure 20:
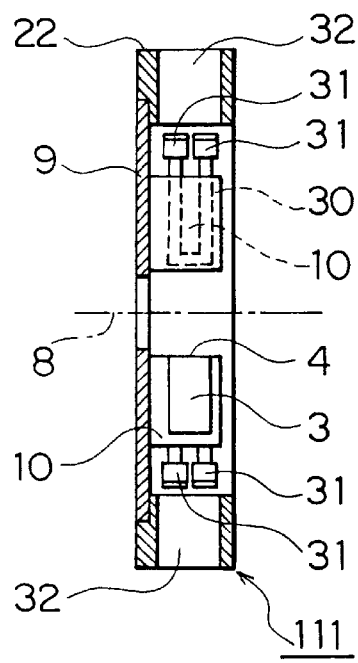
FIG. 20 is a sectional view of an excitation module showing still another embodiment of a diode laser excitation solid-state laser amplifier of the present invention.

Embodiment 12:

FIG. 19 is a front view of an excitation module showing still another embodiment of a diode laser excitation solid-state laser amplifier of the present invention. Moreover, FIG. 20 is a sectional view. In the case of this embodiment, a cooling-water channel 30 shown by a dotted line is formed in a fixing block 10. A tube joint 31 for supplying cooling water into the cooling-water channel 30 is provided for one end of the cooling-water channel 30. A tube introduction port 32 for introducing a tube to supply cooling water into an excitation module is formed on a connecting flange 22. When an excitation module 111 of this embodiment is actually set in a diode laser excitation solid-state laser amplifier, a structure is used in which a solid-state laser rod 1 and a flow tube 2 pass through the central portion of the excitation module 111 in the direction vertical to the paper surface.

In the case of the excitation module 111 of this embodiment, a diode laser array 3 is directly fixed to a fixing block 10 without passing through a heat sink and cooled due to thermal conduction caused by a temperature difference between the diode laser array 3 and the cooling water flowing through the fixing block 10. The cooling-water channel 30 constitutes means for cooling the diode laser array 3 serving as an excitation light source. In the case of the excitation module 111 of this embodiment, a structure is used in which a connecting flange 22 is fixed at the margin of a substrate 9 formed with a flat plate and the excitation modules 111 are connected to each other by a counterbore-provided connecting through-hole 18 and a connecting tapped hole 19 formed on the connecting flange 22.

In the case of this embodiment, the fixing block 10 also serves as a cooler of the diode laser array 3 serving as an excitation light source. Moreover, because it is unnecessary to set means such as a heat sink for cooling the diode laser array 3 other than the fixing block 10, it is possible to downsize an excitation module and moreover, easily fabricate an excitation module. Furthermore, because the connecting flange 22 is provided with the counterbore-provided connecting countersunk hole 18 and the connecting tapped hole 19, it is possible to firmly connect adjacent excitation module 111 to each other.

This embodiment has a structure in which the connecting flange 22 is fixed to the margin of the substrate 9 formed with a flat plate. However, it is needless to say that the same advantage is obtained even by using a substrate at whose margin a flange is integrally formed. Moreover, it is possible to use the same method as the case of the embodiment 1 using a connecting through-hole to connect excitation modules. Furthermore, it is possible to use an excitation module having the same structure as those of the embodiments 6 to 11 or an excitation module having a structure in which the setting angles of a substrate can be changed.

Figure 21:
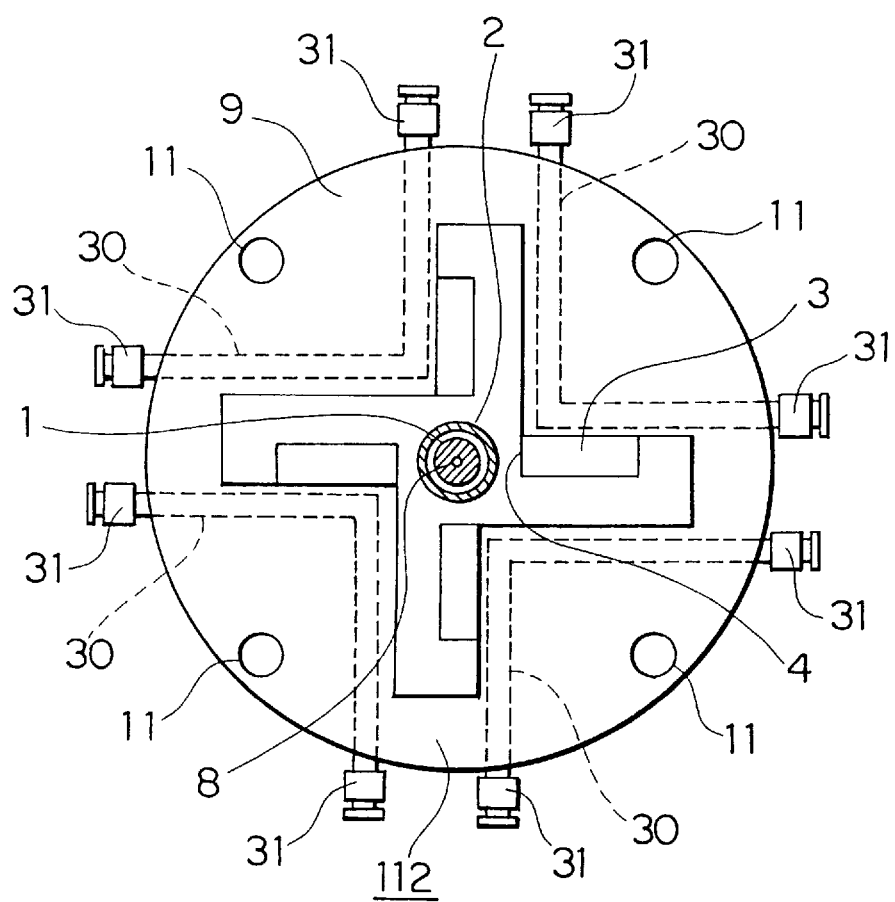
FIG. 21 is a front view of an excitation module showing still another embodiment of a diode laser excitation solid-state laser amplifier of the present invention.

Embodiment 13:

FIG. 21 is a front view of an excitation module showing still another embodiment of a diode laser excitation solid-state laser amplifier of the present invention. The above embodiment 12 has a structure in which a cooling channel is formed on the fixing block 10 for fixing the diode laser array 3 serving as an excitation light source onto the substrate 9 and thereby, the diode laser array 3 is cooled. However, an excitation module 112 of this embodiment has a structure in which a cooling-water channel 30 is formed in a substrate 9 and a diode laser array 3 serving as an excitation light source is directly fixed without using any fixing block. Moreover, the diode laser array 3 is cooled due to thermal conduction caused by a temperature difference between the diode laser array 3 and the cooling water flowing through the substrate 9. The cooling water channel 30 constitutes means for cooling the diode laser array 3 serving as an excitation light source. Moreover, four connecting through-holes 11 are formed at the margin of the substrate 9.

An excitation module 112 of this embodiment makes it possible to cool the diode laser array 3 by fixing the array 3 onto the substrate 9 without using a fixing block or heat sink. Therefore, the structure of the excitation module is further simplified and easily fabricated. Moreover, because the connecting through-holes 11 are formed at the margin of the substrate 9, it is possible to connect and fix a plurality of excitation modules through the connecting through-holes 11 by using bolts and nuts.

In the case of this embodiment, the connecting through-holes 11 are formed at the margin of the substrate 3. However, as shown in the embodiment 3, it is possible to form a counterbore-provided connecting through-hole and a connecting tapped hole at the margin of the substrate 3 and connect adjacent excitation modules to each other by using a hexagon socket head cap screw. Moreover, as shown in the embodiments 6 to 9, it is possible to use a structure in which the setting angles of an excitation module can be changed.

Figure 22:
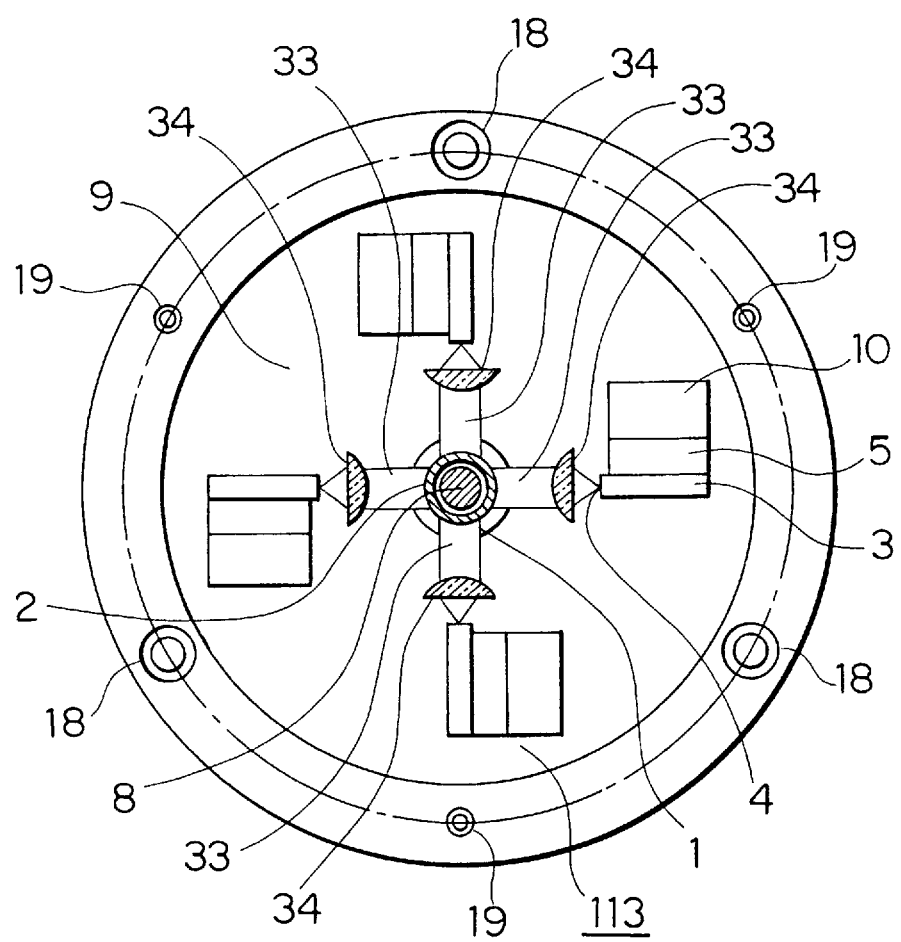
FIG. 22 is a front view of an excitation module showing still another embodiment of a diode laser excitation solid-state laser amplifier of the present invention.

Embodiment 14:

FIG. 22 is a front view of an excitation module showing still another embodiment of a diode laser excitation solid-state laser amplifier of the present invention. In FIG. 22, excitation light 33 is emitted from a light emitting section 4 of a diode laser array 3. Moreover, to correct the spreading angle of the excitation light 33, a planoconvex cylindrical lens 34 having a lens action perpendicularly to an optical axis 8 is used. The cylindrical lens 34 constitutes means for decreasing a divergent angle of the excitation light emitted from a diode laser array 3 and efficiently transmitting the excitation light up to a solid-state laser rod 1. The method of fixing the diode laser array 3 to a substrate 9 is the same as the case of the embodiment 1. Moreover, a counterbore-provided connecting countersunk hole 18 and a connecting tapped hole 19 are formed at the margin of the substrate 9 and the method of connecting excitation modules 113 to each other is the same of the case of the embodiment 3.

In general, the divergent angle of the excitation light emitted from the diode laser array 3 normally reaches hundreds of mrad. Therefore, when the distance between the diode laser array 3 and the solid-state laser rod 1 increases, excitation light components emitted outside of a solid angle facing the solid-state laser rod 1 cannot enter the solid-state laser rod 1 and therefore, it does not contribute to excitation. Thus, the utilization factor of the excitation light is extremely lowered. In the case of this embodiment, the cylindrical lens 34 having a lens action vertically to the optical axis 8 is provided for the substrate 9. Therefore, the divergent angle of the excitation light 33 is corrected vertically to the optical axis 8 to decrease the angle and thereby the utilization factor of the excitation light 33 is improved. Moreover, by using a cylindrical lens 34 with a large-enough NA (Numerical Aperture) value compared to the divergent angle of the excitation light, it is possible to transmit the excitation light 33 having a small loss between the diode laser array 3 and the solid-state laser rod 1. The divergent angle components of the excitation light 33 parallel with the optical axis can be ignored because the longitudinal direction of the solid-state laser rod 1 coincides with the divergence direction In the case of this embodiment, the diode laser array 3 serving as an excitation light source and the cylindrical lens 34 serving as an optical element for decreasing the divergent angle of the excitation light 33 emitted from the diode laser array 3 are fixed on the substrate 9 constituting excitation modules. Therefore, it is possible to keep the positional relation between the diode laser array 3 and the cylindrical lens 34 always constant without depending on the setting position and angle of the excitation module 113.

Moreover, connecting through-holes 11 are formed at the margin of the substrate 9. Therefore, even when connecting a plurality of excitation modules 113 to each other, they can firmly be fixed at accurate positions by tightening them by bolts and nuts through the connecting through-holes 11 and moreover, the fluctuation of excitation distribution for each excitation module can be controlled.

In the case of this embodiment, a structure is shown in which the cylindrical lens 34 is used as an optical element for decreasing the divergent angle of the excitation light 33 emitted from the diode laser array 3. However, an optical element to be set on the substrate 9 is not restricted to the cylindrical lens 34. For example, even if a structure for decreasing divergent angles vertical to and parallel with the optical axis of excitation light is formed by using a spherical lens, it is possible to prevent the utilization factor of excitation light from decreasing. In short, it is enough to set an optical element capable of decreasing the divergent angle of excitation light and transmitting the excitation light to a solid-state laser rod.

Moreover, when a mechanism for varying the distance between the cylindrical lens 34 and the diode laser array 3 serving as an excitation light source is used, it is possible to adjust the divergent angle of the excitation light 33 in accordance with the diameter of the solid-state laser rod 1.

Figure 23:
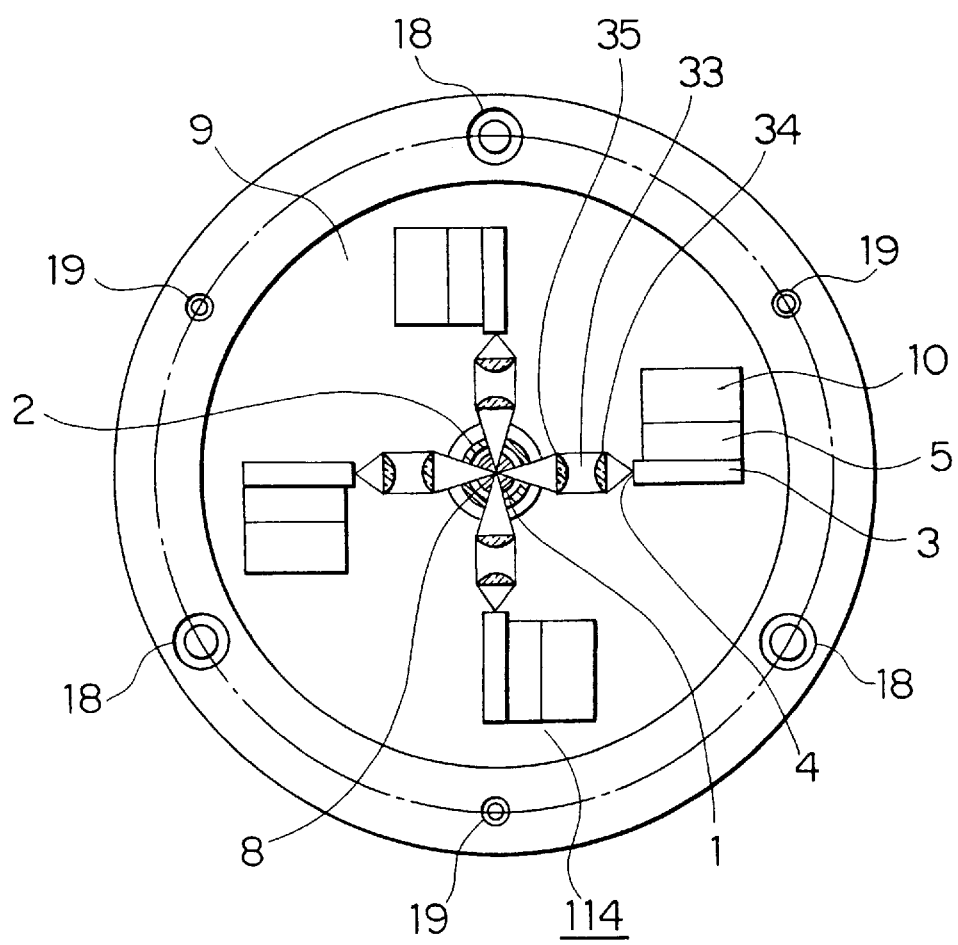
FIG. 23 is a front view of an excitation module showing still another embodiment of a diode laser excitation solid-state laser amplifier of the present invention.

Embodiment 15:

FIG. 23 is a front view of an excitation module showing still another embodiment of a diode laser excitation solid-state laser amplifier of the present invention. In the case of this embodiment, a first planoconvex cylindrical lens 34 and a second planoconvex cylindrical lens 35 are arranged each of which has a lens action in the direction perpendicular to an optical axis. The cylindrical lenses 34 and 35 constitute means for condensing the excitation light emitted from a diode laser array 3. The method of fixing the diode laser array 3 serving as an excitation light source to a substrate 9 is the same as the case of the embodiment 1. Moreover, a counterbore-provided connecting countersunk hole 18 and a connecting tapped hole 19 are formed at the margin of the substrate 9 and the method of connecting excitation modules 114 each other is the same as the case of the embodiment 3.

In the case of this embodiment, the first cylindrical lens 34 is fixed to the substrate 9 so that the distance between the first cylindrical lens 34 and the light emitting section 4 of the diode laser array 3 serving as an excitation light source becomes equal to the focal distance of the first cylindrical lens 34 and the second cylindrical lens 35 is fixed to the substrate 9 so that the distance between the second cylindrical lens 35 and a solid-state laser rod 1 becomes equal to the focal distance of the second cylindrical lens 35. Therefore, the light emitting section 4 of the diode laser array 3 and the center of the solid-state laser rod 1 have a transfer relation in the direction vertical to an optical axis 8. This embodiment is constituted so that the center of the solid-state laser rod 1 coincides with the optical axis 8.

In the case of this embodiment, optical systems comprising the first cylindrical lens 34 and the second cylindrical lens 35 are set on the same substrate 9 so that the light emitting section 4 of the diode laser array 3 and the center of the solid-state laser rod 1 have a transfer relation in the direction vertical to the optical axis. Therefore, it is possible to intensively excite the central portion of the solid-state laser rod 1 without lowering the utilization factor of excitation light and preferentially amplify a high-quality beam mode with a small beam diameter. Moreover, when the first cylindrical lens 34 and second cylindrical lens 35 respectively use a lens with a large-enough NA (Numerical Aperture) compared to the divergent angle of excitation light 33, it is possible to transmit the excitation light 33 with a small loss between the diode laser array 3 and the solid-state laser rod 1.

Also in the case of this embodiment, both optical systems comprising the diode laser array 3 serving as an excitation light source, first cylindrical lens 34, and second cylindrical lens 35 are set on the same substrate 9 constituting the excitation modules 114. Therefore, it is possible to keep the positional relation between the diode laser array 3 and an optical system for transmitting the excitation light 33 always constant without depending on the setting position or angle of the excitation modules 114. Moreover, because the excitation modules are connected each other by using a counterbore-provided countersunk hole 18 and connecting tapped hole 19 formed at the margin of the substrate 9, it is possible to accurately specify the setting positions of and the angle between adjacent excitation modules 114. Therefore, even when a plurality of excitation modules 114 are used by connecting them to each other, it is possible to control the fluctuation of excitation distribution for each excitation module 114.

In the case of this embodiment, a structure is shown in which the light emitting section 4 of the diode laser array 3 and the central portion of the solid-state laser rod 1 have a transfer relation. However, when exciting a solid-state laser rod by using a plurality of diode laser arrays 3, it is possible to obtain uniform excitation distributions without lowering the utilization factor of the excitation light 33 by using a structure in which the transfer position of the light emitting section 4 is shifted from the central portion of the solid-state laser rod 1 by a certain distance.

Figure 24:
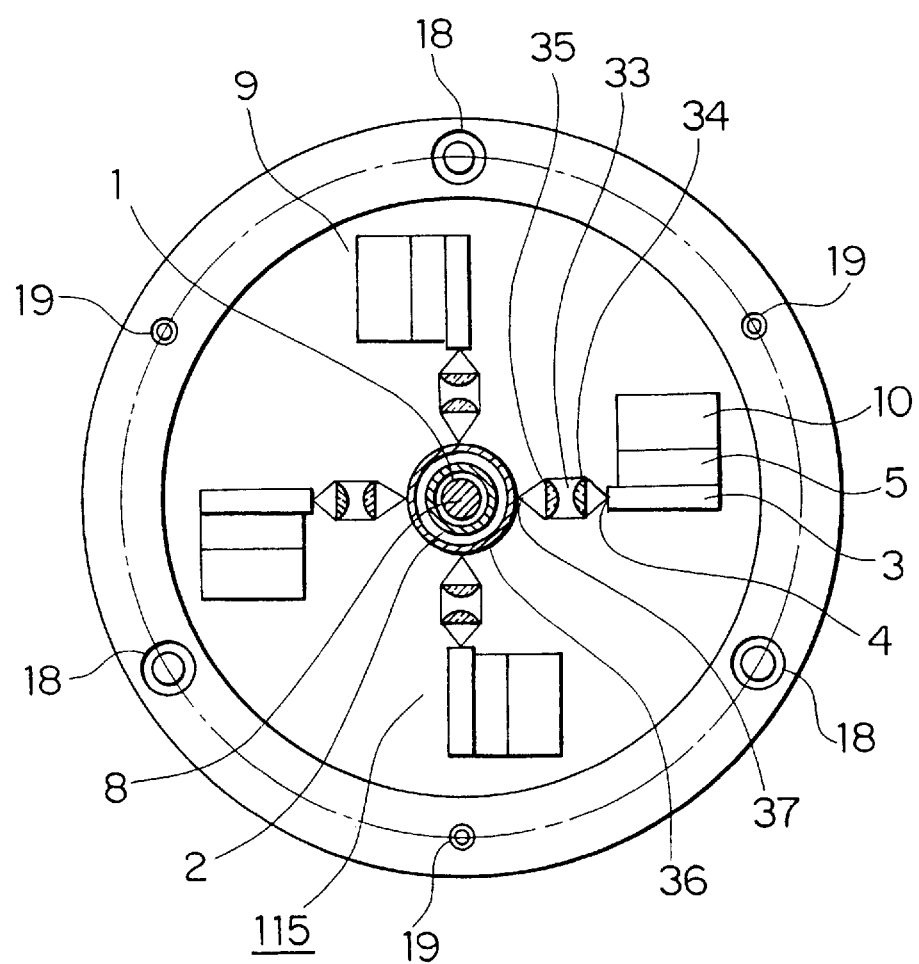
FIG. 24 is a front view of an excitation module showing still another embodiment of a diode laser excitation solid-state laser amplifier of the present invention.

Embodiment 16:

FIG. 24 is a front view of an excitation module showing still another embodiment of a diode laser excitation solid-state laser amplifier of the present invention. In the case of this embodiment, a cylindrical reflector 36 having a reflection surface applied with total reflection treatment for excitation light wavelengths is set on a substrate 9 so as to enclose a solid-state laser rod 1 and fixed in a plane facing the solid-state laser rod 1. An introduction slit 37 for introducing excitation light 33 into the reflector 36 is formed on the reflector 36. In the case of this embodiment, a first cylindrical lens 34 and a second cylindrical lens 35 are set on the substrate 9 so that the light emitting section 4 of the diode laser array 3 and the introduction slit 37 of the reflector 36 have a transfer relation. Moreover, the first and second cylindrical lenses have a lens action in the direction vertical to an optical axis 8. The method of fixing the diode laser array 3 to the substrate 9 is the same as the case of the embodiment 1. Moreover, a counterbore-provided connecting countersunk hole 18 and a connecting tapped hole 19 are formed at the margin of the substrate 9 and the method of connecting excitation modules 115 is the same as the case of the embodiment 3.

This embodiment has a structure in which the light emitting section 4 of the diode laser array 3 is transferred onto the introduction slit 37 of the reflector 36 by using the first cylindrical lens 34 and the second cylindrical lens 35. Therefore, the structure is optically equivalent to the fact that the light emitting section 4 of the diode laser array 3 is set on the introduction slit 37. Therefore, when a lens having a large-enough NA (Numerical Aperture) value compared to divergent angle of the excitation light 33 is used as the first cylindrical lens 34 and the second cylindrical lens 35 respectively, it is possible to transmit the excitation light 33 with a small loss between the diode laser array 3 and the solid-state laser rod 1. Moreover, most of the excitation light 33 emitted from the diode laser array 3 is introduced into the reflector 36.

The excitation light 33 introduced into the reflector 36 passes through a flow tube 2 and enters the solid-state laser rod 1 to excited the rod 1. Moreover, excitation light components, which do not directly enter the solid-state laser rod 1 due to divergence of the excitation light, change their direction by performing total reflection one time or more in the reflector 36 having a reflection plane arranged so as to enclose the solid-state laser rod 1 and applied with total reflection treatment and enter the solid-state laser rod 1. Moreover, the excitation light components emitted to the outside of the solid-state laser rod 1 again without being absorbed out of the excitation light once entering the solid-state laser rod 1 change their direction by performing total reflection one time or more in the reflector 36 and enters the solid-state laser rod 1 again.

In the case of this embodiment, the reflector 36 applied with total reflection treatment inside for excitation light wavelengths is set around the solid-state laser rod 1. Therefore, the excitation light which does not directly enter the solid-state laser rod 1 and moreover, the excitation light once entering the solid-state laser rod 1 and then emitted from the rod 1 without being absorbed, can be effectively used for excitation of the solid-state laser rod 1 because they perform reflection one or more times and are made to enter the solid-state laser rod 1. Thus, it is possible to improve the excitation efficiency.

In the case of this embodiment, the diode laser array 3 serving as an excitation light source, an optical system comprising the first cylindrical lens 34 and the second cylindrical lens 35 for transmitting the excitation light 33 emitted from the diode laser array 3 up to the introduction slit 37 of the reflector 36, and the reflector 36 are set to the same substrate 9. Therefore, it is possible to keep the positional relation between the diode laser array 3, optical system for transmitting the excitation light 33, and reflector 36 constant without depending on the setting position and angle of the excitation module 115.

Moreover, because the excitation modules 115 are connected to each other by the counterbore-provided connecting countersunk hole 18 and the connecting tapped hole 19 formed at the margin of the substrate 9, it is possible to accurately specify the setting position and angle between adjacent excitation modules 115 and the fluctuation of excitation distribution for each excitation module 115 even when a plurality of excitation modules 115 are connected to each other and used.

In the case of this embodiment, the transfer optical system comprising the first cylindrical lens 34 and the second cylindrical lens 35 is used to transmit excitation light from the diode laser array 3 serving as an excitation light source up to the reflector 36. However, it is permitted that the light emitting section 4 of the diode laser array 3 and the introduction slit 37 of the reflector 36 are arranged by making them approach each other up to a distance when the divergence of the excitation light 33 becomes equal to the opening width of the introduction slit 37. Therefore, it is not always necessary to set an optical system.

Figure 25:
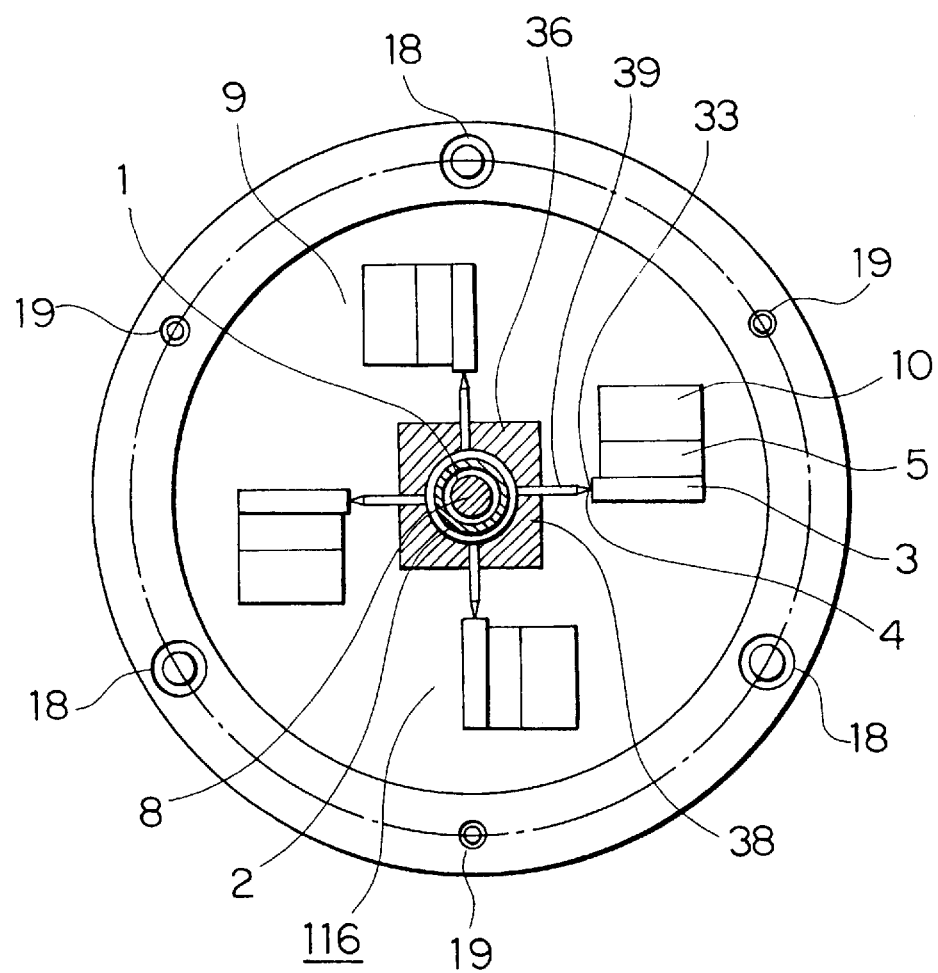
FIG. 25 is a front view of an excitation module showing still another embodiment of a diode laser excitation solid-state laser amplifier of the present invention.

Embodiment 17:

FIG. 25 is a front view of an excitation module showing still another embodiment of a diode laser excitation solid-state laser amplifier of the present invention. In the case of this embodiment, a reflector 36 made of, for example, ceramic is used which is set on a substrate 9 so as to enclose a solid-state laser rod 1 and whose inner surface facing the solid-state laser rod 1 is constituted with a diffusive reflect surface. The reflector 36 is provided with an introduction port 38 for introducing excitation light 33 into the reflector 36. Moreover, to introduce excitation light into the reflector 36, a light guiding plate whose end is applied with antireflection treatment against the excitation light 33 is fixed in the introduction port 38. The method of fixing a diode laser array 3 to the substrate 9 is the same as the case of the embodiment 1. Moreover, a counterbore-provided connecting countersunk hole 18 and a connecting tapped hole 19 are formed at the margin of the substrate 9 and the method of connecting excitation modules 116 each other is the same as the case of the embodiment 3.

In the case of this embodiment, the light emitting section 4 of the diode laser array 3 is fixed to the substrate 9 by making the section 4 approach an end of the light guiding plate 39 up to a distance when the divergence of the excitation light 33 becomes equal to the opening formed at the end of the light guiding plate 39. Moreover, because the end of the light guiding plate 39 is applied with antireflection treatment, it is possible to make most of the excitation light 33 emitted from the diode laser array enter the light guiding plate 39.

The excitation components with a divergent angle smaller than the solid angle at the outgoing edge of the light guiding plate 39 viewed from the incoming edge of the plate 39 out of the excitation light 33 entering the light guiding plate 39 directly passes through the light guiding plate 39 and reaches the reflector 36. The light guiding plate 39 is made of a material such as sapphire with a refraction index higher than that of a material such as adhesive contacting the outside of the light guiding plate 39. Therefore, it is possible to introduce the excitation light components having a divergent angle larger than the solid angle of the outgoing edge of the plate 39 viewed from the incoming edge of the plate 39 into the reflector 36 at a small loss because the components are totally reflected on the lateral of the light guiding plate 39.

The excitation light 33 introduced into the reflector 36 passes through a flow tube 2 and enters the solid-state laser rod 1 to excite the rod 1. Moreover, excitation light components which do not directly enter the solid-state laser rod 1 due to divergence of excitation light are also diffused and reflected on the inner surface of the reflector 36 set so as to enclose the solid-state laser rod 1 and some or all of the components enter the solid-state laser rod 1. Furthermore, the excitation light components emitted to the outside of the solid-state laser rod 1 again without being absorbed out of the excitation light once entering the solid-state laser rod 1 is diffused and reflected on the inner surface of the reflector 36 and some or all of them enters the solid-state laser rod 1 again.

In the case of this embodiment, the inner surface of the reflector 36 provided around the solid-state laser rod 1 is constituted with a diffusive reflect surface. Therefore, it is possible to easily obtain a uniform excitation distribution in the solid-state laser rod 1 and moreover, improve the excitation efficiency. Furthermore, in the case of this embodiment, the diode laser array 3 serving as an excitation light source and the reflector 36 are set on the same substrate 9 and the light guiding plate 39 for guiding the excitation light 33 in the reflector 36 is fixed to the introduction port 38 of the reflector 36. Therefore, it is possible to keep the positional relation between the diode laser array 3, light guiding plate 39 for transmitting the excitation light 33, and reflector 36 always constant without depending on the setting position or angle of the excitation module 116.

Moreover, because the excitation modules 116 are connected to each other by the counterbore-provided connecting countersunk hole 18 and the connecting tapped hole 19 formed at the margin of the substrate 9, it is possible to accurately specify the setting position and angle between adjacent excitation modules 116 and control the fluctuation of excitation distribution for each excitation module 116 even when a plurality of excitation modules 116 are connected each other and used.

In the case of this embodiment, a structure is shown in which the excitation light emitted from the diode laser array 3 is made to directly enter the light guiding plate 39. Moreover, it is also possible to use a structure in which the light emitting section 4 of the diode laser array 3 is transferred to an end of the light guiding plate 39 by using a transfer optical system similarly to the case of the embodiment 16. Furthermore, by using a structure in which excitation light is transmitted into the reflector 36 through the introduction port 38 by an optical fiber, it is unnecessary to use the light guiding plate 39 and moreover, it is possible to relieve the setting accuracy of the diode laser array 3 and easily fabricate an excitation module.

In the case of this embodiment and the embodiment 16, a reflector whose inner surface is applied with total reflection treatment for excitation light wavelengths and a reflector whose inner surface is constituted with a diffusive reflect surface are set on a substrate constituting excitation modules. However, the structure of a reflector is not restricted to the above case. In short, it is enough that a reflector having a structure making it possible to use excitation light components not directly entering a solid-state laser rod or excitation light components not being absorbed though once entering the solid-state laser rod for excitation of the solid-state laser rod by changing the traveling directions of the components is set on a substrate.

Figure 26:
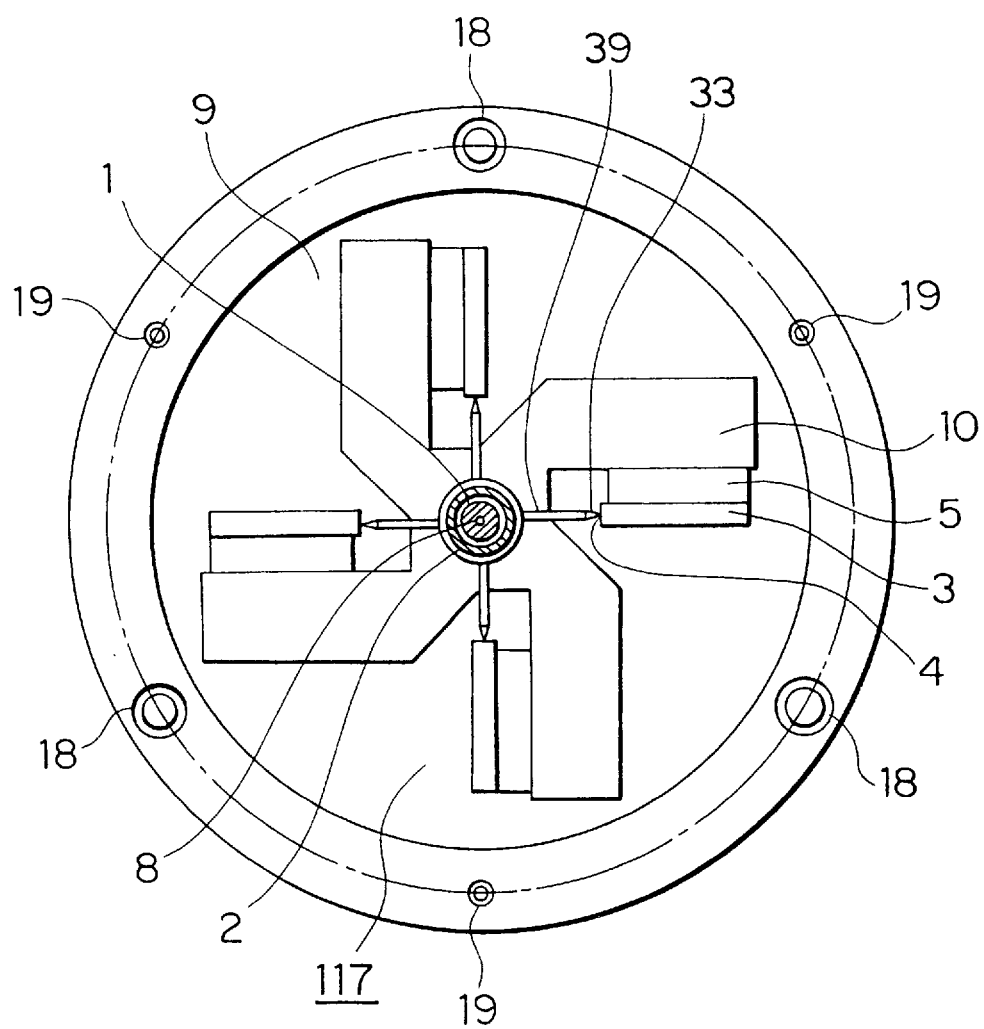
FIG. 26 is a front view of an excitation module showing still another embodiment of a diode laser excitation solid-state laser amplifier of the present invention.

Embodiment 18:

FIG. 26 is a front view of an excitation module showing still another embodiment of a diode laser excitation solid-state laser amplifier of the present invention. In the case of this embodiment, four fixing blocks 10 for fixing four diode laser arrays 3 serving as excitation light sources on a substrate 9 also serve as reflectors for improving the excitation efficiency. That is, the reflectors also serve as meas for fixing the diode laser arrays 3 serving as excitation light sources. Surfaces facing a solid-state laser rod 1 and a flow tube 2 located at front ends of four fixing blocks 10 are formed like a segment and applied with total reflection treatment in accordance with an excitation light wavelength.

Because the front ends of four fixing blocks 10 are butted and fixed to the substrate 9, an annular reflector having a circular cross section is formed. Moreover, a light guiding plate 39 is fixed at a position facing the light emitting section 4 of the diode laser array 3 on the fixing block 10 and excitation light 33 emitted from the diode laser array 3 is guided into the reflector comprising four fixing blocks 10. Furthermore, a counterbore-provided connecting countersunk hole 18 and a connecting tapped hole 19 are formed at the margin of the substrate 9. The method of connecting excitation modules 117 each other is the same as the case of the embodiment 3.

In the case of this embodiment, the fixing block 10 for fixing the diode laser array 3 serving as an excitation light source to the substrate 9 also serves a reflector. Therefore, it is possible to decrease the number of parts of the excitation module 117 provided with a reflector for improving the excitation efficiency and moreover, manufacture the excitation module 117 at a low cost and simplify its fabrication process.

Moreover, because the fixing block 10 also serves as a reflector and the diode laser array 3 serving as an excitation light source and the light guiding plate 39 for guiding excitation light are fixed on the fixing block 10, it is possible to easily adjust the position of the diode laser array 3 for guiding the excitation light into the reflector when setting the array 3. Furthermore, because the excitation light source is integrated with the reflector, a positional displacement hardly occurs between the diode laser array 3 serving as an excitation light source, light guiding plate 39 for guiding excitation light, and reflector even if a disturbance such as mechanical vibration occurs and therefore, a stable amplification performance can be maintained. The advantage when connecting the excitation modules 117 to each other by the counterbore-provided connecting countersunk hole 18 and the connecting tapped hole 19 formed at the margin of the substrate 9 is the same as the case of the embodiments 16 and 17.

In the case of this embodiment, a structure is shown in which total reflection treatment according to an excitation wavelength is applied to a segmental plane forming a reflector and facing the solid-state laser rod 1 and flow tube 2 located at the front end of the fixing block 10. However, the same advantage can be obtained by constituting the fixing block with ceramic and constituting the segmental plane forming the reflector with a diffusive reflect surface and moreover, a further uniform excitation distribution can be obtained in the solid-state laser rod.

Moreover, in the case of this embodiment, a structure is shown in which the cross section of the reflector constituted with four fixing blocks is formed into a circle. However, the cross section of the reflector is not restricted to the circle. For example, by forming the cross section of the reflector constituted with four fixing blocks into a rectangle, it is possible to easily manufacture a fixing block.

In the case of the embodiments 16 to 18, a structure is shown in which a reflector is set on a substrate constituting excitation modules and adjacent excitation modules are connected to each other by a counterbore-provided connecting through-hole and a connecting tapped hole formed at the margin of the substrate. However, the method of connecting excitation modules is not restricted to the above method. It is also possible to form connecting through-holes and connect excitation modules by bolts and nuts similarly to the case of the embodiment 1.

Figure 27:
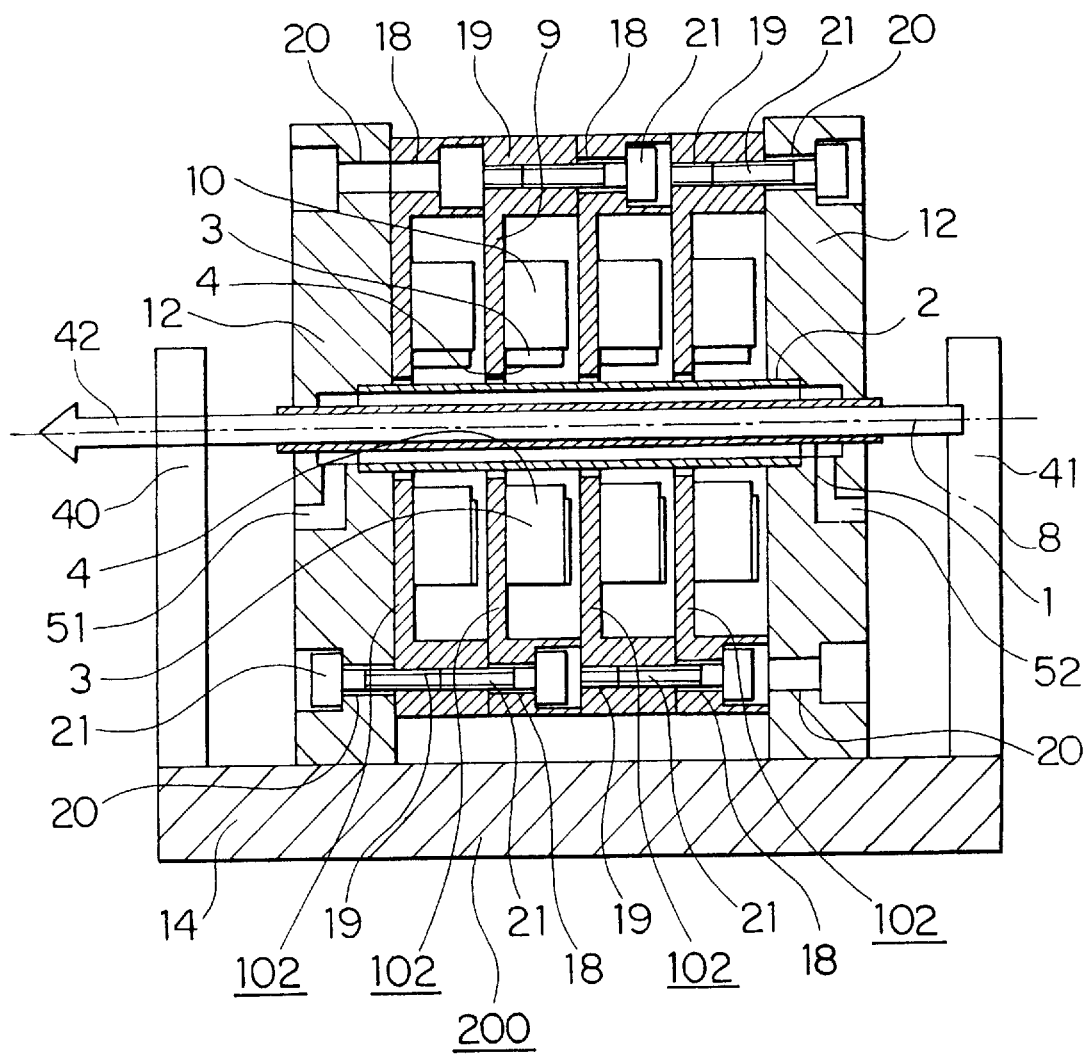
FIG. 27 is a transverse sectional view showing a diode laser excitation solid-state laser of the present invention.

Embodiment 19:

FIG. 27 is a sectional view showing a diode laser excitation solid-state laser of the present invention. In the case of the above embodiments 1 to 18, structures of diode laser excitation solid-state laser amplifiers are described. In the case of this embodiment, however, a diode laser excitation solid-state laser using a diode laser excitation solid-state laser amplifier is described For example, in the case of a diode laser excitation solid-state laser 200 provided with excitation modules 102 having the same structure as those of the embodiment 3, a partial reflection mirror 40 and a total reflection mirror 41 are vertically set from a bottom plate 14 so that they are located at the front and rear of a solid-state laser rod 1. Therefore, spontaneous emission light produced in the solid-state laser rod 1 is reciprocated and amplified in an optical resonator and output as a laser beam 42 with arranged directivities. That is, this can be used as a diode laser excitation solid-state laser. The partial reflection mirror 40 and the total reflection mirror 41 constitute the optical resonator.

This embodiment can use any one of the structures of the above embodiments 1 to 18 for the structure of the diode laser excitation solid-state laser 200 when using it as a diode laser excitation solid-state laser.

In the case of any one of the above embodiments, the structure of a single excitation module is shown in which excitation light generated by a diode laser array is applied to a solid-state laser rod from four directions vertical to an optical axis. However, the number of diode laser arrays serving as excitation light sources and the excitation light applying directions are not restricted to the above case. It is possible to use any structure capable of applying excitation light to a solid-state laser rod, laterally.

Moreover, in the case of any one of the above embodiments, a case is shown in which a diode laser array constituted by linearly arranging a plurality of light emitting elements is used for an excitation light source. It is needless to say that the same advantage can be obtained by using a diode laser having a single light emitting element as an excitation light source.

According to one aspect of the present invention, a solid-state laser rod extending along the optical axis of a laser beam and including an active medium therein, side plates for supporting both ends of the solid-state laser rod respectively, a flow tube which is provided so as to enclose the solid-state laser rod and through which a cooling medium for cooling the solid-state laser rod is circulated, a plurality of excitation modules arranged along the solid-state laser rod, each excitation module being constituted with a flat substrate having a hole formed at the center thereof through which the solid-state laser rod is passed and at least one excitation light source fixed to the flat substrate for providing excitation light to the solid-state laser rod from the side of the solid-state laser rod, and connecting and fixing means for connecting a plurality of the excitation modules to each other and fixing them to the side plates. Therefore, it is possible to accurately, simply, and firmly connect a plurality of excitation modules to each other at normal setting positions and normal setting angles and moreover, keep the positional relation between a plurality of excitation light sources, easily improve the amplification performance, and control the deviation of the excitation modules from the normal setting positions and angles and the deviation of the positional relation between the excitation light sources even if a disturbance such as mechanical vibration occurs.

According to another aspect of the present invention, because there is provided a diode laser excitation solid-state laser amplifier, wherein the excitation modules are connected to each other at a predetermined angle while successively shifting the angle about the solid-state laser rod, it is possible to set the excitation modules so that the excitation light applying directions of adjacent excitation modules to the solid-state laser rod differ and to obtain uniform excitation distributions in the solid-state laser rod. Therefore, it is possible to obtain a stable amplification performance and a stable laser output.

According to still another aspect of the present invention, because there is provided a diode laser excitation solid-state laser amplifier, wherein an excitation light source setting portion also serves as means for cooling an excitation light source, the number of parts constituting an excitation module is decreased and the excitation module is easily fabricated and moreover, the excitation module can be downsized.

According to a further aspect of the present invention, because there is provided a diode laser excitation solid-state laser amplifier which has a condensing or transmitting means set between the excitation light source and the solid-state laser rod for condensing or transmitting excitation light, it is possible to transmit excitation light from the excitation light source up to the solid-state laser rod at a small loss.

According to a still further aspect of the present invention, because there is provided a diode laser excitation solid-state laser amplifier which has a reflector having an opening for passing the excitation light and a reflection surface provided so as to enclose the solid-state laser rod, it is possible to improve the utilization factor of the excitation light emitted from an excitation light source for excitation of the solid-state laser rod.

According to another aspect of the present invention, there is provided a diode laser excitation solid-state laser amplifier, wherein the reflection surface is a diffusive reflect surface. Therefore, it is possible to greatly improve the uniformity of an excitation light distribution.

According to still another aspect of the present invention, because there is provided a diode laser excitation solid-state laser amplifier, wherein the reflector also serves as means for fixing the excitation light source, it is possible to decrease the number of parts, manufacture an excitation module at a low cost, and simplify the fabrication process. Moreover, because the excitation light source is fixed to the reflector, it is possible to easily adjust the positions of the excitation light source for introducing excitation light into the reflector.

According to a further aspect of the present invention, there is provided a diode laser excitation solid-state laser which comprises a solid-state laser rod extending along the optical axis of a laser beam and including an active medium therein, side plates for supporting both ends of the solid-state laser rod respectively, a flow tube which is provided so as to enclose the solid-state laser rod and through which a cooling medium for cooling the solid-state laser rod is circulated, a plurality of excitation modules arranged along the solid-state laser rod, each excitation module being constituted with a flat substrate having a hole formed at the center thereof through which the solid-state laser rod is passed and at least one excitation light source fixed by means for fixing it to the flat substrate for providing excitation light to the solid-state laser rod from the side of the solid-state laser rod, connecting and fixing means for connecting a plurality of the excitation modules to each other and fixing them to the side plates, a partial reflection mirror provided for one end of the solid-state laser rod, and a total reflection mirror provided for the other end of the solid-state laser rod. Therefore, it is possible to stably generate a high-efficiency high-quality laser beam.

What is claimed is:

1. A diode laser excitation solid-state laser amplifier comprising:

a solid-state laser rod extending along the optical axis of a laser beam and including an active medium therein;

side plates for supporting both ends of said solid-state laser rod respectively;

a flow tube which is provided so as to enclose said solid-state laser rod and through which a coolant for cooling said solid-state laser rod is circulated;

a plurality of excitation modules axially disposed along said solid-state laser rod, each excitation module comprising a flat substrate having a hole formed at the center thereof through which said solid-state laser rod is passed, at least one excitation light source, and setting means for fixing said excitation light source to said substrate, said excitation light source providing excitation light to said solid-state laser rod from the side of said solid-state laser rod; and connecting and fixing means for connecting a plurality of said excitation modules to each other and fixing said excitation modules to said side plates.

2. A diode laser excitation solid-state laser amplifier according to claim 1, wherein said excitation modules are connected to each other at a predetermined angle by successively rotationally shifting each of said excitation modules about said solid-state laser rod.

3. A diode laser excitation solid-state laser amplifier according to claim 1, wherein said setting means comprises cooling means for cooling said excitation light source.

4. A diode laser excitation solid-state laser amplifier according to claim 1, further comprising a first means set between said excitation light source and said solid-state laser rod for condensing or transmitting said excitation light.

5. A diode laser excitation solid-state laser amplifier according to claim 1, further comprising a reflector having an opening for passing said excitation light and a reflection surface enclosing said solid-state laser rod.

6. A diode laser excitation solid-state laser amplifier according to claim 5, wherein said reflection surface is a diffusive reflect surface.

7. A diode laser excitation solid-state laser amplifier according to claim 5, wherein said reflector also serves as means for fixing said excitation light source.

8. A diode laser excitation solid-state laser comprising:

a solid-state laser rod extending along the optical axis of a laser beam and including an active medium therein;

side plates for supporting both ends of said solid-state laser rod respectively;

a flow tube which is provided so as to enclose said solid-state laser rod and through which a coolant for cooling said solid-state laser rod is circulated;

a plurality of excitation modules axially disposed along said solid-state laser rod, each excitation module comprising a flat substrate having a hole formed at the center thereof through which said solid-state laser rod is passed, at least one excitation light source, and setting means for fixing said excitation light source to said substrate, said excitation light source providing excitation light to said solid-state laser rod from the side of said solid-state laser rod;

connecting and fixing means for connecting a plurality of said excitation modules to each other and fixing said excitation modules to said side plates;

a partial reflection mirror set to one end of said solid-state laser rod; and a total reflection mirror set to the other end of said solid-state laser rod.

* * * * *